US010963882B2

(12) United States Patent
Garlick et al.

(10) Patent No.: US 10,963,882 B2
(45) Date of Patent: *Mar. 30, 2021

(54) SYSTEM AND SERVER FOR RECEIVING TRANSACTION REQUESTS

(71) Applicant: IPCO 2012 Limited, Rickmansworth (GB)

(72) Inventors: Steven George Garlick, Rickmansworth (GB); Neil Antony Masters, Rickmansworth (GB)

(73) Assignee: IPCO 2012 LIMITED, London (GB)

( * ) Notice: Subject to any disclaimer, the term of this patent is extended or adjusted under 35 U.S.C. 154(b) by 322 days.

This patent is subject to a terminal disclaimer.

(21) Appl. No.: 15/682,476

(22) Filed: Aug. 21, 2017

(65) Prior Publication Data

US 2017/0372319 A1 Dec. 28, 2017

Related U.S. Application Data

(63) Continuation of application No. 14/581,153, filed on Dec. 23, 2014, now Pat. No. 9,741,037.

(30) Foreign Application Priority Data

Dec. 18, 2014 (GB) ...................................... 1422635

(51) Int. Cl.
*G06Q 20/40* (2012.01)
*G06Q 20/26* (2012.01)

(52) U.S. Cl.
CPC ......... *G06Q 20/4016* (2013.01); *G06Q 20/26* (2013.01); *G06Q 20/405* (2013.01)

(58) Field of Classification Search
CPC .................................................... G06Q 20/40
(Continued)

(56) References Cited

U.S. PATENT DOCUMENTS

| 4,100,533 A | 7/1978 | Napolitano et al. |
| 5,931,961 A | 8/1999 | Ranganathan et al. |

(Continued)

FOREIGN PATENT DOCUMENTS

| EP | 0 459 134 A2 | 12/1991 |
| EP | 1 025 680 A2 | 8/2000 |

(Continued)

OTHER PUBLICATIONS

U.S. Appl. No. 14/581,153, filed Dec. 23, 2014, Garlick et al.
(Continued)

*Primary Examiner* — Robert R Niquette
(74) *Attorney, Agent, or Firm* — Harness, Dickey & Pierce, P.L.C.

(57) ABSTRACT

The present invention provides a system for receiving transaction requests from a financial institution, the system comprising i) a plurality of servers connected over a network, wherein each server comprises a storage unit configured to store a settlement risk position which is the sum of the value of previously processed transaction requests over a period of time, a debit cap value associated with the financial institution, an adjustment value and a new transaction request having a transaction value, wherein the debit cap value stored in each server is determined in accordance with the total debit cap attributed to the financial institution and the number of servers in the system; ii) communication circuitry configured to receive the adjustment value over the network, the adjustment value being determined as the average, value of the settlement risk position across the plurality of servers; and iii) control circuitry configured to determine whether the debit cap has been exceeded by comparing tire debit cap value with the sum of the settlement risk position, the adjustment value and the transaction value of the new transaction request, whereby in the event that the (Continued)

debit cap value will be exceeded, rejecting the new transaction request.

5 Claims, 7 Drawing Sheets

(58) Field of Classification Search
USPC .......................................................... 705/44
See application file for complete search history.

(56) References Cited

U.S. PATENT DOCUMENTS

| | | | |
|---|---|---|---|
| 6,039,245 A | 3/2000 | Symonds et al. | |
| 6,219,651 B1* | 4/2001 | Bublitz | G06Q 20/10 705/1.1 |
| 6,470,342 B1 | 10/2002 | Gondi et al. | |
| 6,629,135 B1 | 9/2003 | Ross, Jr. et al. | |
| 6,980,550 B1 | 12/2005 | Yip et al. | |
| 7,029,713 B2 | 3/2006 | Shah et al. | |
| 7,065,670 B2 | 6/2006 | Gahan et al. | |
| 7,131,108 B1 | 10/2006 | Tang et al. | |
| 7,444,335 B1 | 10/2008 | Colrain et al. | |
| 8,898,333 B1 | 11/2014 | White et al. | |
| 9,741,037 B2 | 8/2017 | Garlick et al. | |
| 10,318,911 B1 | 6/2019 | Cynamon et al. | |
| 2002/0087467 A1 | 7/2002 | Mascavage, III et al. | |
| 2002/0138431 A1 | 9/2002 | Antonin et al. | |
| 2002/0161788 A1 | 10/2002 | McDonald | |
| 2003/0023877 A1 | 1/2003 | Luther et al. | |
| 2003/0065623 A1 | 4/2003 | Corneil et al. | |
| 2003/0065702 A1 | 4/2003 | Singh et al. | |
| 2003/0125969 A1 | 7/2003 | Kizer et al. | |
| 2004/0015566 A1 | 1/2004 | Anderson et al. | |
| 2004/0021360 A1 | 2/2004 | Key et al. | |
| 2004/0042472 A1 | 3/2004 | Satch et al. | |
| 2004/0049455 A1 | 3/2004 | Mohsenzadeh | |
| 2004/0085894 A1 | 5/2004 | Wang et al. | |
| 2004/0199467 A1 | 10/2004 | Martin, Jr. et al. | |
| 2005/0021836 A1 | 1/2005 | Reed et al. | |
| 2005/0050398 A1 | 3/2005 | Rao et al. | |
| 2005/0058063 A1 | 3/2005 | Masuyama et al. | |
| 2005/0086165 A1 | 4/2005 | Pawelczyk et al. | |
| 2005/0144133 A1 | 6/2005 | Hoffman et al. | |
| 2005/0144303 A1 | 6/2005 | Zhang et al. | |
| 2005/0171811 A1 | 8/2005 | Campbell et al. | |
| 2005/0195815 A1 | 9/2005 | Chaudhuri | |
| 2005/0209957 A1 | 9/2005 | Kasiviswanathan et al. | |
| 2007/0061379 A1 | 3/2007 | Wong et al. | |
| 2007/0165625 A1 | 7/2007 | Eisner et al. | |
| 2007/0170245 A1 | 7/2007 | Elbaum et al. | |
| 2007/0239758 A1 | 10/2007 | Devine et al. | |
| 2007/0263571 A1 | 11/2007 | Hermann et al. | |
| 2008/0071664 A1 | 3/2008 | Silverman et al. | |
| 2008/0072226 A1 | 3/2008 | Armes et al. | |
| 2008/0109335 A1 | 5/2008 | Keohane et al. | |
| 2008/0219207 A1 | 9/2008 | Chen et al. | |
| 2009/0006233 A1 | 1/2009 | Chemtob | |
| 2009/0083339 A1 | 3/2009 | Reed et al. | |
| 2009/0089339 A1 | 4/2009 | Mitchell et al. | |
| 2009/0144220 A1 | 6/2009 | Feng et al. | |
| 2009/0177675 A1 | 7/2009 | Trumbull et al. | |
| 2009/0292810 A1 | 11/2009 | Hotta et al. | |
| 2010/0254394 A1 | 10/2010 | Barta et al. | |
| 2010/0332941 A1 | 12/2010 | Gilson | |
| 2011/0119258 A1 | 5/2011 | Forutanpour et al. | |
| 2011/0225091 A1 | 9/2011 | Plastina et al. | |
| 2011/0292788 A1 | 12/2011 | Tsuchiya | |
| 2012/0078815 A1 | 3/2012 | Rossi et al. | |
| 2012/0084191 A1 | 4/2012 | Mintz | |
| 2012/0191792 A1 | 7/2012 | Chebiyyam | |
| 2012/0259722 A1 | 10/2012 | Mikurak | |
| 2012/0271765 A1 | 10/2012 | Cervenka et al. | |
| 2013/0013516 A1 | 1/2013 | Hamilton | |
| 2013/0044749 A1 | 2/2013 | Eisner et al. | |
| 2013/0054516 A1 | 2/2013 | Somogyi et al. | |
| 2013/0159029 A1 | 6/2013 | Thaw | |
| 2013/0293363 A1 | 11/2013 | Plymouth et al. | |
| 2013/0339189 A1 | 12/2013 | Minerick | |
| 2017/0344960 A1 | 11/2017 | Garlick et al. | |
| 2017/0344964 A1 | 11/2017 | Garlick et al. | |
| 2017/0353420 A1 | 12/2017 | Garlick et al. | |
| 2018/0174140 A1 | 6/2018 | Garlick et al. | |

FOREIGN PATENT DOCUMENTS

| | | |
|---|---|---|
| JP | 08-101875 | 4/1996 |
| JP | 2002-042038 | 2/2002 |
| JP | 2002-133306 | 5/2002 |
| JP | 2002-269482 A | 9/2002 |
| JP | 2002-319058 | 10/2002 |
| JP | 2004-501420 | 1/2004 |
| JP | 2004-118524 | 4/2004 |
| JP | 2004-134879 | 4/2004 |
| JP | 2004-159146 | 6/2004 |
| JP | 2006-120036 | 5/2006 |
| JP | 2007-164535 | 6/2007 |
| JP | 2009-282807 | 12/2009 |
| JP | 2010-044552 | 2/2010 |
| JP | 2010-157008 | 7/2010 |
| JP | 2011-118898 | 6/2011 |
| JP | 2011-138523 | 7/2011 |
| JP | 2012-182580 | 9/2012 |
| JP | 2012-242994 | 12/2012 |
| JP | 2013-532322 | 8/2013 |
| JP | 2013-206041 | 10/2013 |
| JP | 2018-501593 | 1/2018 |
| WO | WO99/21322 | 4/1999 |
| WO | WO2008/109043 | 9/2008 |

OTHER PUBLICATIONS

U.S. Appl. No. 15/537,115, filed Jun. 16, 2017, Garlick et al.
U.S. Appl. No. 15/537,129, filed Jun. 16, 2017, Garlick et al.
U.S. Appl. No. 15/537,164, filed Jun. 16, 2017, Garlick et al.
U.S. Appl. No. 15/537,181, filed Jun. 16, 2017, Garlick et al.
U.S. Appl. No. 16/855,926, filed Apr. 22, 2020, Garlick et al.
PCT/GB2015/053034: PCT International Search Report and Written Opinion (10 pages) dated Dec. 7, 2015. PCT/GB2015/053034 has common subject matter as the instant application, the same inventors and the same Applicant, IPCO 2012 Limited.
GB 1422900.9: Great Britain Search Report (3 pgs.), dated Jul. 1, 2015. Great Britain Patent Application No. 1422900.9 has common subject matter as the instant application, the same inventors and the same Applicant, IPCO 2012 Limited.
U.S. Appl. No. 15/537,115: (a) Office action dated Mar. 8, 2019; (b) Office action dated Aug. 14, 2019; (c) Office action dated May 22, 2020; and (d) Office action dated Sep. 17, 2020. U.S. Appl. No. 15/537,115 has common subject matter as the instant application, the same inventors and the same Applicant, IPCO 2012 Limited.
AU 2015365764: (a) Examination Report dated Apr. 10, 2019; (b) Notice of Acceptance dated Sep. 12, 2019; and (c) Notice of Grant dated Jan. 9, 2020. AU2015365764 has a priority claim in common with the instant application.
CA 2,971,665: (a) Office Action dated Apr. 26, 2018; and (b) Office Action dated Apr. 3, 2019. Canadian Patent Application No. 2,971,665 has common subject matter as the instant application, the same inventors and the same Applicant, IPCO 2012 Limited.
CO NC2017/0007195: (a) Opposition dated May 26, 2018; (b) Official Action dated Sep. 14, 2018; and (c) Official Action dated Oct. 16, 2019. Columbian Patent Application No. NC2017/0007195 has common subject matter as the instant application, the same inventors and the same Applicant, IPCO 2012 Limited.
EA 201791339: (a) Office Action dated Oct. 9, 2018; and (b) Office Action dated Feb. 27, 2019. Eurasian Patent Application No. 201791339 has common subject matter as the instant application, the same inventors and the same Applicant, IPCO 2012 Limited.
EP 15784114.9: (a) Examination Report dated Feb. 12, 2019. European Patent Application No. 15784114.9 has common subject matter as the instant application, the same inventors and the same Applicant, IPCO 2012 Limited.

(56) References Cited

OTHER PUBLICATIONS

JP 2017-551371: (a) Office Action dated Jul. 17, 2018; (b) Office Action dated Nov. 20, 2018; and (c) Decision of Grant dated Jan. 17, 2019. Japanese Patent Application No. 2017-551371 has common subject matter as the instant application, the same inventors and the same Applicant, IPCO 2012 Limited.
SG 112017049070: (a) Written Opinion dated May 16, 2018; and (b) Notification of Grant dated Jun. 28, 2019. Singapore Patent Application No. 11201704907Q has common subject matter as the instant application, the same inventors and the same Applicant, IPCO 2012 Limited.
SA 517381770: Examination Report dated Jul. 9, 2020. Saudi Arabian Patent Application No. 517381770 has common subject matter as the instant application, the same inventors and the same Applicant, IPCO 2012 Limited.
PCT/GB2015/053042: PCT International Search Report and Written Opinion (13 pages) dated Jan. 28, 2016. PCT/GB2015/053042 has common subject matter as the instant application, the same inventors and the same Applicant, IPCO 2012 Limited.
GB 1422637.7: Great Britain Search Report (4 pgs.), dated Jun. 25, 2015. GB1422637.7 has common subject matter as the instant application, the same inventors and the same Applicant, IPCO 2012 Limited.
U.S. Appl. No. 15/537,129: (a) Office action dated Jun. 6, 2019; (b) Office Action dated Oct. 2, 2019; (c) Notice of Allowance dated Mar. 2, 2020; and Notice of Allowability dated Jun. 4, 2020. U.S. Appl. No. 15/537,129 has common subject matter as the instant application, the same inventors and the same Applicant, IPCO 2012 Limited.
AU 2015365699: (a) Examination Report dated Aug. 20, 2018; (b) Notice of Acceptance dated Jan. 7, 2019; and (c) Notice of Grant dated May 2, 2019. AU 2015365699 has common subject matter as the instant application, the same inventors and the same Applicant, IPCO 2012 Limited.
CO NC2017/0007205: (a) Opposition dated May 26, 2018; (b) Official Action dated Sep. 21, 2018; (c) Official Action dated May 30, 2019; and (d) Office Action dated Nov. 5, 2019. Columbian Patent Application No. NC2017/0007205 has a priority claim in common with the instant application.
EA 201791342: (a) Office Action dated Oct. 10, 2018; and (b) Office Action dated Feb. 14, 2019. Eurasian Patent Application No. 201791342 has a priority claim in common with the instant application.
IN 201717021286: Examination Report dated Apr. 28, 2020. Indian Patent Application No. 201717021286 has a priority claim in common with the instant application.
JP 2017-551374: (a) Notification of Refusal dated Jul. 24, 2018; and (b) Notification of Grant dated Feb. 5, 2019. Japanese Patent Application No. 2017-551374 has a priority claim in common with the instant application.
SG 11201704899T: (a) Written Opinion dated Mar. 27, 2018; and (b) Notification of Grant dated Aug. 29, 2018. Singapore Patent Application No. 11021704899T has a priority claim in common with the instant application.
PCT/GB2015/053036: PCT International Search Report and Written Opinion (10 pages) dated Dec. 7, 2015. PCT/GB2015/053036 has common subject matter as the instant application, the same inventors and the same Applicant, IPCO 2012 Limited.
GB 1422641.9: Great Britain Examination Report (7 pgs.) dated Jun. 8, 2015. Great Britain Patent Application No. 1422641.9 has common subject matter as the instant application, the same inventors and the same Applicant, IPCO 2012 Limited.
U.S. Appl. No. 15/537,164: (a) Office action dated Mar. 13, 2019; (b) Office action dated Aug. 19, 2019; and (c) Office action dated Jun. 2, 2020. U.S. Appl. No. 15/537,164 has common subject matter as the instant application, the same inventors and the same Applicant, IPCO 2012 Limited.
AU 2015365697: (a) Examination Report dated Apr. 12, 2019; (b) Examination Report dated Sep. 5, 2019; and (c) Examination Report dated Apr. 7, 2020. AU 2015365697 has common subject matter as the instant application, the same inventors and the same Applicant, IPCO 2012 Limited.
CA 2,971,669: (a) Office Action dated Apr. 23, 2018; (b) Office Action dated Apr. 2, 2019; and (c) Office Action dated Jan. 13, 2020. Canadian Patent Application No. 2,971,669 has common subject matter as the instant application, the same inventors and the same Applicant, IPCO 2012 Limited.
CO NC2017/0007194: (a) Opposition dated Jul. 9, 2018; (b) Official Action dated Sep. 14, 2018; and (c) Official Action dated May 30, 2019. Columbian Patent Application No. NC2017/0007194 has common subject matter as the instant application, the same inventors and the same Applicant, IPCO 2012 Limited.
EA 201791340: (a) Office Action dated Oct. 10, 2018; and (b) Office Action dated Mar. 14, 2019. Eurasian Patent Application No. 201791340 has common subject matter as the instant application, the same inventors and the same Applicant, IPCO 2012 Limited.
EP 15784115.6: (a) Examination Report dated Feb. 12, 2019. European Patent Application No. 15784115.6 has common subject matter as the instant application, the same inventors and the same Applicant, IPCO 2012 Limited.
JP 2017-551372: (a) Notification of Refusal dated Aug. 7, 2018; and (b) Decision of Refusal dated Nov. 20, 2018. Japanese Patent Application No. 2017-551372 has common subject matter as the instant application, the same inventors and the same Applicant, IPCO 2012 Limited.
SG 11201704888U: (a) Written Opinion dated May 28, 2018; and (b) Notification of Grant dated Jun. 28, 2019. Singapore Patent Application No. 11201704888U has common subject matter as the instant application, the same inventors and the same Applicant, IPCO 2012 Limited.
PCT/GB2015/053037: PCT International Search Report and Written Opinion (10 pages) dated Dec. 7, 2015. PCT/GB2015/053037 has common subject matter as the instant application, the same inventors and the same Applicant, IPCO 2012 Limited.
GB 1422640.1: Great Britain Search Report (4 pgs.) dated Jun. 25, 2015. Great Britain Patent Application No. 1422640.1 has common subject matter as the instant application, the same inventors and the same Applicant, IPCO 2012 Limited.
U.S. Appl. No. 15/537,181: (a) Office action dated Mar. 13, 2019; (b) Office action dated Aug. 30, 2019; (c) Office action dated Apr. 28, 2020; and (d) Office action dated Aug. 17, 2020. U.S. Appl. No. 15/537,181 has common subject matter as the instant application, the same inventors and the same Applicant, IPCO 2012 Limited.
AU 2015365698: (a) Examination Report dated Apr. 15, 2019; and (b) Examination Report dated Sep. 16, 2019. AU 2015365698 has common subject matter as the instant application, the same inventors and the same Applicant, IPCO 2012 Limited.
CA 2,971,679: (a) Office Action dated Apr. 23, 2018; and (b) Office Action dated Apr. 3, 2019. Canadian Patent Application No. 2,971,679 has common subject matter as the instant application, the same inventors and the same Applicant, IPCO 2012 Limited.
CO NC2017/0007201: (a) Opposition dated May 26, 2018; (b) Official Action dated Sep. 14, 2018; and (c) Official Action dated Nov. 5, 2019. Columbian Patent Application No. NC2017/0007201 has common subject matter as the instant application, the same inventors and the same Applicant, IPCO 2012 Limited.
EA 201791341: (a) Office Action dated Oct. 9, 2018. Eurasian Patent Application No. has common subject matter as the instant application, the same inventors and the same Applicant, IPCO 2012 Limited.
EP 15784116.4: (a) Examination Report dated Feb. 12, 2019. European Patent Application No. 15784116.4 has common subject matter as the instant application, the same inventors and the same Applicant, IPCO 2012 Limited.
JP 2017-551373: (a) Notification of Refusal dated Jul. 31, 2018; and (b) Notification of Grant dated Nov. 27, 2018. Japanese Patent Application No. 2017-551373 has common subject matter as the instant application, the same inventors and the same Applicant, IPCO 2012 Limited.

(56) References Cited

OTHER PUBLICATIONS

SA 517381730: Examination Report dated Jun. 11, 2020. Saudi Arabian Patent Application No. 517381730 has common subject matter as the instant application, the same inventors and the same Applicant, IPCO 2012 Limited.
SG 11201704895R: (a) Written Opinion dated May 28, 2018; and (b) Notification of Grant dated Jul. 11, 2019. Singapore Patent Application No. 11201704895R has common subject matter as the instant application, the same inventors and the same Applicant, IPCO 2012 Limited.
U.S. Appl. No. 16/855,926: Office action dated Aug. 6, 2020. U.S. Appl. No. 16/855,926 has common subject matter as the instant application, the same inventors and the same Applicant, IPCO 2012 Limited.
U.S. Appl. No. 14/581,153: (a) Office action dated Feb. 9, 2017; and (b) Notice of Allowance dated Apr. 10, 2017. The instant application is a continuation of U.S. Appl. No. 14/581,153.
IETF Network Working Group, Request for Comments 3074, RFC3074, Feb. 2001, Volz B. et al, "DHC load balancing algorithm"; www.tools.ietf.org/pdf/rfc3074; 10 pgs.

* cited by examiner

Debit Cap = -10000 — 651

| | Debit cap = -5000<br>Site 1 SRP | Debit cap = -5000<br>Site 2 SRP | Total Debit cap = -10000<br>TOTAL SRP |
|---|---|---|---|
| Debit 1<br>2500 | -2500 | 0 | -2500 |
| | -2500 | Debit 2   -300<br>300 | -2800 |

Adjustment cycle — 656

$$\text{Adjustment site 1} = \left(\frac{-2800}{2}\right) - 2500 = +1100$$

$$\text{Adjustment site 2} = \frac{-2800}{2} - 300 = -1100$$

Debit 3   Adjusted SRP   New trans        Adjusted SRP   New trans
2600      -2500 + 1100 + (-2600)          -300 + -1100 + 0
          = -4000                          = -1400                           -5400

Allowed as less than
Debit cap of £5000

FIG. 3B

SYSTEM AND SERVER FOR RECEIVING TRANSACTION REQUESTS

CROSS REFERENCE TO RELATED APPLICATIONS

This application claims priority to and is a continuation of U.S. patent application Ser. No. 14/581,153, filed Dec. 23, 2014. and claims priority to UK Patent Application N. 1422635.1, filed Dec. 18, 2014. The entire contents of each of these plications is incorporated by reference herein.

BACKGROUND

Field of the Disclosure

The present invention relates to a system and server for receiving transaction requests.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Modern electronic banking systems allow funds to be electronically transferred between bank accounts of different banks using electronic transaction request messages (transaction messages). Such a method of transferring funds is both secure (making use of various known security protocols which allow secure transfer of data over a network) and convenient (since it allows bank account holders to make requests to transfer funds at any time, 24 hours a day, 365 days a year).

However, although such electronic transaction request messages may be made at any time, funds are only actually transferred between banks on a periodic basis. This is known as a "settlement cycle" model. During each settlement cycle, transaction messages issued by banks are received and recorded. Then, at the end of the settlement cycle, funds are actually transferred between banks (this is known as "settlement"), on the basis of the recorded transaction messages. The time period between settlement cycles is typically 8, 12 or 24 hours, although any other suitable time period may be used.

Because the eventual settlement between banks is based on the recorded transaction messages made during the settlement cycle, it is of the utmost importance that the recorded transaction messages are stored and managed effectively, even in the case of, for example, a technology failure or natural disaster. This ensures that, at the end of each settlement cycle, each completed transaction is taken into account during settlement and is only taken into account once. This prevents any overpayment or underpayment of nerd money between banks. The present invention therefore aims to alleviate at least the problem of providing a resilient and flexible system for effectively storing and managing electronic transact on messages.

SUMMARY

The present invention provides a system for receiving transaction requests from a financial institution, the system comprising i) a plurality of servers connected over a network, wherein each server comprises a storage unit configured to store a settlement risk position which is the sum of the value of previously processed transaction requests over a period of time, a debit cap value associated with the financial institution, an adjustment value and, a new transaction request having a transaction value, wherein the debit cap value stored in each server is determined in accordance with the total debit cap attributed to the financial institution and the number of servers in the system; ii) communication circuitry configured to receive the adjustment value over the network, the adjustment value being determined as the average value of the settlement risk position across the plurality of servers; and control circuitry configured to determine whether the debit cap has been exceeded by comparing the debit cap value with the sum of the settlement risk position, the adjustment value and the transaction value of the new transaction request, whereby in the event that the debit cap value will be exceeded, rejecting the new transaction request.

Advantageously, this arrangement means that the chance of a valid transaction amount (that is, a transaction amount allowed by the total debit cap of a financial institution) being rejected as a result of the total debit cap being spread amongst a plurality of servers is reduced. An arrangement for processing electronic transactions with greater flexibility is therefore achieved.

In an embodiment, the adjustment value is determined periodically.

In an embodiment, the same absolute adjustment value is provided to each of the plurality of servers.

In an embodiment, the sign of the adjustment value is determined based on the settlement risk position at the server.

The present invention provides a server connectable to a system of servers, wherein each server is configured to receive transaction requests from a financial institution and comprises i) a storage unit configured to store a settlement risk position which is the sum of the value of previously processed transaction requests over a period of time, a debit cap value associated with the financial institution, an adjustment value and a new transaction request having a transaction value, wherein the debit cap value is determined in accordance with the total debit cap attributed to the financial institution and the number of servers in the system; ii) communication circuitry configured to receive the adjustment value over the network, the adjustment value being determined as the average value of the settlement risk position across the plurality of servers; and iii) control circuitry configured to determine whether the debit cap has been exceeded by comparing the debit cap value with the sum of the settlement risk position, the adjustment value and the transaction value of the new transaction request, whereby in the event at the debit cap value will be exceeded, rejecting the new transaction request.

In an embodiment, the adjustment value is received periodically.

In an embodiment, the same absolute adjustment value is provided to each of the servers in the system.

In an embodiment, the sign of the adjustment value is determined based on the settlement risk position at the server.

The foregoing paragraphs have been provided by way of general introduction, and are not intended to limit the scope of the following claims. The described embodiments, together with further advantages, will be best understood by reference to the following detailed description taken in conjunction with the accompanying Figures.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein;

FIG. 3B illustrates a solution to the problem illustrated by FIG. 3A, according to an embodiment;

DESCRIPTION OF THE EMBODIMENTS

Figure 1:
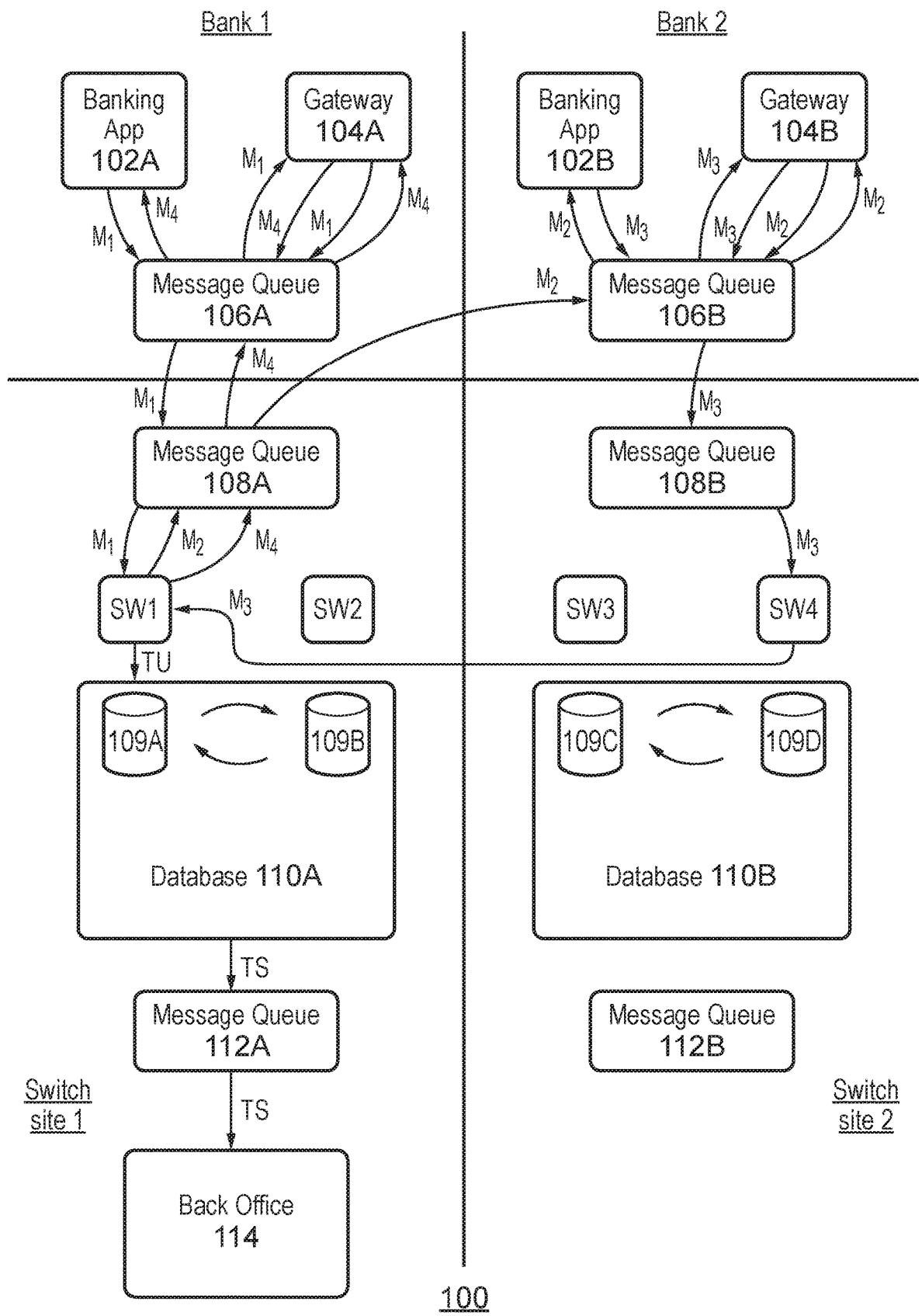
FIG. 1 shows various components of a system according to an embodiment.

Referring now to the drawings, wherein like reference numerals designate identical or corresponding parts throughout the several view.

FIG. 1 shows an overview of a system 100 according to an embodiment. The system comprises a plurality of banks (in this case, two banks, Bank 1 and Bank 2) and a plurality of switch sites (in this case, two switch sites. Switch Site 1 and Switch Site 2). Each bank is connected to both switch sites via a data communication channel (not shown). Similarly, the switch sites are connected to each other via a data communication channel (not shown). The data communication channel may be implemented via a data communication network such as the interact. For improved resilience, the switch sites are separated so that, in the case of a problem such as a technological fault or natural disaster at one switch site, processing may be continued at the other switch site. For example, the switch sites may be located at different geographical locations.

Each of the banks comprises a banking application 102A, 102B, a gateway application 104A, 104B (also referred to simply as the "gateway") and a message queue unit 106A, 106B. Each of the switch sites comprises a message queue unit 108A, 108B, a plurality of switches (in this case, two switches at each site, switches SW1 and SW2 at Switch Site 1 and switches SW3 and SW4 at Switch Site 2), a database 110A, 110B and a message queue unit 112A, 112B. Furthermore, one of the switch sites (in this case, Switch Site 1) comprises a back office unit 114. The function of each of these components is described in detail below. It is noted that corresponding components of the respective banks or switch sites (indicated by the same number but a different letter fir example, databases 110A and 110B in Switch Sites 1 and 2, respectively, and message queues 106A and 106B in Banks 1 and 2, respective) are functionally identical.

FIG. 1 shows an example message flow implemented by the system 100 so as to allow a transaction to be carried out between bank accounts. In the example given in FIG. 1, a transaction of funds from a bank account at Bank 1 to a different bank account at Bank 2 is carried out. However, it will be appreciated that the system 100 could also be used to carry out a transaction of funds between different bank accounts at the same bank. Moreover, of course, Bank 2 may generate transaction requests which transfer funds from an account located at Bank 2 to an account within Bank 1.

The message flow to implement the transaction between Bank 1 and Bank 2 starts when the holder of the bank account at Bank 1 instructs Bank 1 to transfer funds to a bank account held at Bank 2. This results in the generation of a transaction request message M1. The message M1 comprises an identifier of the bank and specific bank account from which funds are to be transferred (for example, the bank sort code of Bank 1 and the account number), an identifier of the bank, and specific bank account to which funds are to be transferred (for example, the bank sort code of Bank 2 and the account number) and the amount and currency of the money to be transferred. The message M1 will also contain a unique identifier which uniquely identifies the transaction to which the message M1 relates (for example, a unique number, a unique arrangement of letters, a unique combination of letters and numbers, or some other arrangement). This information is provided by the banking application 102A. The banking application 102A may be provided by a bank and accessed by a customer using a secure website or a mobile application such as an application provided on a customer's mobile terminal or tablet computer. This unique identifier is referred to as the "transaction identifier".

The message M1 is passed to the message queue unit 106A, in which the message M1 is temporarily stored until the gateway 104A becomes available to process the message M1. The message queue unit 106A stores the message M1 along with any other messages that are to be sent to the gateway 104 in a queued arrangement (so that a message received at an earlier time is sent to the gateway 104A before a message received at a later time). The gateway 104A then collects the message at the front of the queue when it becomes available.

When the gateway 104A is available to receive the message M1, the message queue unit 106A passes the message M1 to the gateway 104A. The gateway 104A ensures that the message M1 is in a predetermined standardised format for use with the system 100 (for example, standardised format ISO20022) and digitally signs the message M1. The gateway 104A also adds routing information to M1 (for example, to a header of M1) identifying the switch site to which M1 should be sent. The operation of the gateway 104A is described in more detail later on. As will be apparent later, the gateway 104A is optional to system but is provided in embodiments. In the absence of the gateway 104A, the message M1 would need to be correctly formatted and signed using the banking application 102A, as well as correctly routed.

Once the format of the message M1 has been checked, the message M1 has been digitally signed and routing information has been added to the message M1, the message M1 is passed back to the message queue unit 106A for temporary storage before transmission to the message queue unit 108A, 108B of one of the switch sites. Again, the message queue unit 106A stores the message M1 along with any other messages that are to be sent to the switch sites in a queued arrangement. Messages at the front of the queue in the message queue unit 106A are sent to either the message queue unit 108A of Switch Site 1 or the message queue unit 108B of Switch Site 2 in accordance with the routing in in each message. The gateway of each bank will typically route each successive message alternately between the two switch sites. Thus, for example, if the message at the front of the queue in message queue unit 106A is sent to message queue unit 108A, then the next message in the queue will be sent to message queue unit 108B, the message after that will be sent to message queue unit 108A, and so on. In this case, it is seen that the message M1 is sent to message queue unit 108A of Switch Site 1.

The message M1 is temporarily stored in the message queue unit 108A until one of the switches SW1 and SW2 becomes available to process the message M1. Again, the message queue unit 108A stores the message M1 along with any other messages that are to be sent to the switches SW1 or SW2 in a queued arrangement, so that the message at the front of the queue is sent to whichever one of the switches SW1 and SW2 first becomes available. It is noted that the bank-side message queues 106A, 106B and the system-side message queues 108A, 108B may be implemented using a system such as IBM® MQ.

In this case, the message M1 is sent to switch SW1, Switch SW1 then applies a hashing function to the message M1. The hashing function is a function of the transaction identifier of the message M1 and of the number of available switches across all sites (thus, four switches in this embodiment), and the output of the hashing function is a number identifying the switch which is to be used to process the message M1 (for example, number 1, 2, 3 or 4 for switches SW1, SW2, SW3 or SW4, respectively). The switch identified by the hashing function may be the same switch to which the message M1 is originally sent by the message queue unit 108A or, alternately, it may be a different switch. If the switch identified by the hashing function is a different switch, then the original receiving switch (switch SW1 in this case) passes the message M1 to the switch identified by the hashing function. In the embodiment of FIG. 1, however, the switch identified by the hashing function is the same switch at which the message M1 was originally received (that is, switch SW1), and therefore the message is not transferred to a different switch. The hashing algorithm is described in more detail later on.

After the message M1 has been received by the switch SW1 the state of the transaction to which the message M1 relates is recorded in database 110A. In this case, the database 110A will record that the transaction is still pending and that one message (message M1) out of the three messages required for a transaction to be completed has so far been received or transmitted by the switch SW1 (these three messages being messages M1, M2, and M3—see below).

The database 110A is a clustered database generated on the basis or data stored in both storage units 109A and 109B. The database 110A may be implemented as an Mnesia database, for example. The switches SW1, SW2 cause the transaction state for each transaction processed by these switches to be recorded and updated in the database 110A (this is signified by the arrow TU in FIG. 1). The storage units 109A, 109B are kept in synchronisation with each other so that each transaction state is recorded and updated in both storage unit 109A and storage unit 109B. The storage units 109A, 109B therefore contain identical copies of the same data, and each transaction state in the database 110A can thus be retrieved from either storage unit 109A or storage unit 109B. Advantageously, this means that transaction states in the database 110A are still accessible when one of the storage units 109A, 109B becomes non-operational (due to a fault or scheduled maintenance or the like).

The database 110B has an identical set-up to that of database 110A, in that the database 110B is a clustered database generated on the basis of the data stored in both storage units 109C, 109D. The switches SW3, SW4 cause the transaction state for each transaction processed by these switches to be recorded and updated in the database 110B. The storage units 109C, 109D are kept in synchronisation with each other so that each transaction state is recorded and updated in both storage unit 109C and storage unit 109D. The storage units 109C, 109D therefore contain identical copies of the same data, and each transaction state in the database 110B can thus be retrieved from either storage unit 109C or storage unit 109D.

Once the transaction state in the database 110A has been recorded following the receipt of message M1 by the switch SW1, the switch SW1 generates a transaction information message M2. The transaction information message M2 is for informing the bank which is to receive the transaction funds (that is, Bank 2) of the transaction. The receiving bank is also informed of the specific bank account which is to receive the funds and the amount and currency of the money which is to be received. Thus, like the transaction request message M1, the message M2 comprises an identifier of the bank and specific bank account to which funds are to be transferred (for example, the bank sort code of Bank 2 and the account number) and the amount and currency of the money to be transferred. The message M2 also comprises the same transaction identifier as message M2 (because message M1 and message M2 are related to the same transaction). The message M2 may also comprise an identifier of the bank and specific bank account from which the funds are being sent (for example, the bank sort code of Bank 1 and the account number), so as to allow an account holder of the receiving bank account to know the identity of the sender.

Once the message M2 has been generated, it is transmitted to Bank 2 via the message queue units 108A and 106B and the gateway 104B. The message queue unit 106B and the gateway 104B of Bank 2 are functionally identical to the message queue unit 106A and gateway 104A of Bank 1. Thus, the message M2 is temporarily stored and queued in the message queue unit 108A. It is then transmitted over the data communication channel to message queue unit 106B (on the basis of the identifier of Bank 2 in the message M2), where it is again temporarily stored and queued until the gateway 104B is available to receive it. Once received by the gateway 104B, the message M2 is validated (using a digital signature generated by the switch). It is then passed back to the message queue unit 106B, where it is temporarily stored and queued before being passed to the banking application 102B of Bank 2. Thus, Bank 2 is notified of the transaction and of the specific bank account which is to receive the transaction funds. This specific bank account can therefore be credited with the transaction funds, even though settlement between Bank 1 and Bank 2 has not yet occurred.

Following the transmission of message M2 to Bank 2, the transaction state in the database 110A is updated so as to record that the transaction is still pending and that two messages (messages M1 and M2) out of the three messages required for a transaction to be complete have so far been received or transmitted by the switch SW1.

Once the message M2 has been successfully processed by the banking application 102B of Bank 2, the banking application 102B generates a first transaction confirmation message M3. The message M3 is a confirmation that the message M2 has been successfully received and processed by Bank 2, and comprises the same transaction identifier as messages M1 and M2 (because messages M1, M2 and M3 are all related to the same transaction). The message M3 is temporarily stored and queued in the message queue unit 106B, and is then passed to the gateway 104B so as to ensure that it is in the appropriate standardised format and for addition of a digital signature and routing information. Message M3 is then passed back to the message queue unit 106B to be temporarily stored and queued prior to transfer to one of the switch sites. Like with message queue unit 106A, messages at the front of the queue in the message queue unit 106B are typically alternately sent to the message queue unit 108A of Switch Site 1 and the message queue unit 108B of Switch Site 2, in accordance with the routing information added to each message by the gateway 104B. In this case, it can be seen that message M3 is sent to message queue unit 108B at Switch Site 2.

The message M3 is temporarily stored and queued in message queue unit 108B until one of the switches SW3 and SW4 is available to receive the message M3. In this case, it can be seen that switch SW4 is the first switch to become available when message M3 is at the front of the queue, and therefore message M3 is sent to switch SW4.

At switch SW4, the hashing algorithm is applied to message M3. Because message M3 has the same transaction identifier as message M1 (and message M2), the output of the hashing algorithm will be the same as the output of the hashing algorithm for message M1. That is, the output of the hashing algorithm will indicate that switch SW1 should be the switch to which message M3 is sent. Thus, as can be seen in FIG. 1, switch SW4 transmits message M3 to switch SW1. This transmission occurs over the data communication channel connecting Switch Site 1 and 2.

Once message M3 is received by the switch SW1, the transaction state in the database 110A is updated so as to record that the transaction is complete because all messages (messages M1, M2 and M3) required for a transaction to be complete have now been received or transmitted by the switch SW1. In this case, the transaction state is moved from an in-flight table in the database 110A, which records the transaction details of pending transactions, to a complete table in the database 110A, which records the transaction details of completed transactions.

The three messages M1, M2 and M3 are sufficient for determining that a transaction is complete because, once message M3 has been received, it is confirmed that the payment information contained in message M2 has been received and successfully processed by Bank 2. The same amount of money that is debited from the sending account of Bank 1 following transmission of the message M1 has therefore been credited to the receiving account of Bank 2. It is noted that this allows customers of Bank 1 and Bank 2 to experience an instantaneous transfer of funds, even though settlement between Bank 1 and Bank 2 has not yet occurred.

Following the update of the transaction state to record that the transaction is complete in the database 110A, a transaction summary record TS is created on the basis of the transaction state. The transaction summary record TS contains sufficient information so as to allow settlement of the funds between the financial accounts defined by transaction messages and is stored in message queue unit 112A. In particular, the transaction summary record TS comprises the name, address, sort code and account number of the sender (originator) of the funds, the name, address, sort code and account number of the receiver (beneficiary) of the funds, the amount of money to be transferred (including in what currency the transfer is to take place) and the unique transaction identifier. The transaction summary record TS may also comprise additional information such as the time and date at which the record is created, time stamps relating to when the transaction messages (M1, M2 and M3) were sent or received, a settlement date and time (or another indicator of the specific settlement cycle in which the transaction should be processed) and an indicator of whether or not the transaction was successful. Of course, this list is not exhaustive, and any information which may be useful in performing settlement and accounting for all the transactions may be included in the transaction summary record TS.

Although it is not shown in FIG. 1, the message queue unit 112A also has the form of a clustered database in which two copies of transaction summary records TS are stored on separate storage units. The two copies being kept synchronised improves the resilience of the system 100, since even if one copy of the transaction summary records becomes unavailable (due to a technical fault or the like), the second copy can still be used. The message queue unit 112A temporarily stores and queues the transaction summary record until the back office unit 114 (see below) is ready to receive the transaction summary record for settlement processing.

The creation of the transaction summary record TS and the operation of the message queue units 112A and 112B may be implemented using a software application such as Rabbit MQ®, for example. In fact, the clustered database 110A and message queue unit 112A (and, similarly, the clustered database 110B and message queue unit 112B) may be functionally joined by the software application so that even though the clustered database and message queue unit at each site are, in fact, completely separate entities, read and write functionality between them (including creation of the transaction summary record TS) is implemented easily and reliably.

Following the successful storage of the transaction summary record TS in the message queue unit 112A, the switch SW1 generates a second transaction confirmation message M4. The message M4 is a confirmation message for confirming to Bank 1 that the transaction has been successfully carried out at Bank 2, and comprises the same transaction identifier as messages M1, M2 and M3 (because messages M1, M2, M3 and M4 are all related to the same transaction). The message M4 is transmitted to Bank 1 via the message queue units 108A and 106A and the gateway 104A. That is, the message M4 is temporarily stored and queued in the message queue unit 108A. It is then transmitted over the data communication channel to message queue unit 106A, where it is again temporarily stored and queued until the gateway 104A is available to receive it. Once received by the gateway 104A, the message M4 is validated (using a digital signature generated by the switch). It is then passed back to the message queue unit 106A, where it is temporarily stored and queued before being passed to the banking application 102A of Bank 1. Thus, it is confirmed to Bank 1 that the transfer of funds has been successfully carried out.

In the case where the account holder at the instructing bank (Bank 1, in the, example of FIG. 1) first transmits the message M1 to a receiving switch via the Internet using a requesting application, and the processing switch (as determined by the hashing function) is not the same as this original receiving switch (note that this is not the case in the example of FIG. 1, since the processing switch SW1 is also the switch at which the message M1 was originally received), then the message M4 will be first forwarded to the original receiving switch from the processing switch and then transmitted to the instructing bank (via the relevant message queue units 108A, 108B, 106A, 106B) from the original receiving switch. This is necessary so as to ensure that the message M4 is returned to the same requesting application which sent message M1 for the transaction.

The back office unit 114 is configured to process the transaction summary records stored and queued in the message queue units 112A, 112B so as to allow settlement to occur between Bank 1 and Bank 2. This is possible because each of the transaction summary records contains all information necessary to track how much money is being transferred from Bank 1 to Bank 2 (or vice versa) for each transaction, and thus, at the end of the settlement cycle, the total amount of money to be transferred between the banks can be calculated using the transaction summary records. This ensures that the crediting and debiting of bank accounts the each transaction, as described above, is matched with a real money deferred net settlement transfer between the banks. The transaction summary records TS are stored and queued in the message queue 112A before being transmitted to the back office unit 114 the processing. The processing at the back office unit 114 comprises storing the transaction summary records TS and keeping running totals of the bi-lateral (bank to bank) and multi-lateral (bank to all other banks) liability for each bank (that is, the money owed) for use in settlement. Settlement then occurs at the end of the settlement cycle (for example, every 8, 12 or 24 hours, as described above), on the basis of this data held by the back office unit 114.

Note that, in this embodiment, the back office unit 114 is located at Switch Site 1. Thus, transaction summary records TS stored in message queue unit 112B at Switch Site 2 must transmitted over the data communication channel between the switch sites so as to be received by the back office unit 114. In an alternative embodiment, the back office unit 114 may be located at Switch Site 2, in which case, transaction summary records TS stored in message queue unit 112A at Switch Site 1 would have to be transmitted over the data communication channel between the switch sites so as to be received by the back office unit 114. In another embodiment, there is a plurality of back office units 114, one located at each of Switch Site 1 and Switch Site 2. In this case, only one of the back office units will be used for settlement. However, the existence of a plurality of back office units 114 means that if one of the back office units 114 becomes non-operational (due to a fault or scheduled maintenance or the like), then transaction summary records TS stored in the message queue units 112A, 112B can be redirected to the remaining operational hack office unit 114 for settlement. The system 100 therefore has improved resilience, since settlement can still be carried out using the transaction summary records TS despite a failure of one or the back office units 114.

Distribution of Transaction Requests

As already mentioned, in the embodiment of FIG. 1, the transaction messages (in particular, the message M1 and M3, which are received from banks) are distributed amongst the switches SW1, SW2, SW3 and SW4 via a hashing function (also referred to as a "hashing algorithm"). This helps to ensure that the messages are distributed evenly amongst the switches, thus providing improved load balancing of the system 100. It also helps to ensure that messages related to the same transaction are processed by the same switch or, at least, by switches which have access to the same database 110A, 110B. The hashing function will now be explained in more detail As previously explained, the hashing function maps each message to a switch. More specifically, the hashing function uses the unique transaction identifier of a message and the number of switches as inputs, and outputs a number indicating which one of the switches SW1, SW2, SW3 and SW4 is to be used to process the message. That is, the hashing function has the form:

Switch number=function (transaction identifier, total number of switches)

Specific examples of hashing functions (that is, functions which only output one of a fixed number of predetermined output values, even though there may be a large or, possibly, infinite number of inputs) could be used are known in the art, and will not be discussed in detail here.

In embodiments, the switch that first receives a message from one of the banks (or, more specifically, from one of the message queue units 108A, 108B) performs the hashing function on the message. This identifies the switch which will be used to process the message. The message is then sent (or, in other words, forwarded) to the identified switch. This function is performed in processing circuitry located within the switch using computer readable instructions stored in a storage unit within the switch. The forwarding of a message after application of the hashing function has been previously exemplified with respect to FIG. 1 (in which the message M3, which is initially passed to switch SW4, is forwarded to switch SW1 after application of the hashing algorithm). The use of the hashing function is used for messages received from the banks (that is, messages M1 and M3 in the example of FIG. 1), since these are the messages which may be initially sent to any one of the switches SW1, SW2, SW3 and SW4.

All messages associated with the same transaction comprise the same transaction identified. This allows such messages to be forwarded to and processed by the same switch or, at least, by switches which have access to the same database 110A, 110B, if this is possible. This is advantageous, as it allows the relevant database 110A, 110B to be kept up-to-date with the progress of a particular transaction more easily and efficiently.

Whilst it is advantageous to allocate a single identified switch to process all messages associated with a particular transaction, in the event that the identified switch becomes inoperable, due to damage or scheduled maintenance or the like, in embodiments of the disclosure, a priority list of alternative switches that should handle the messages associated with that transaction is provided.

An example of the priority order of switches is explained below in Table 1

TABLE 1

| First Switch | Second Switch | Third Switch | Fourth Switch |
| --- | --- | --- | --- |
| SW1 | SW2 | SW3 | SW4 |
| SW2 | SW1 | SW4 | SW3 |
| SW3 | SW4 | SW1 | SW2 |
| SW4 | SW3 | SW2 | SW1 |

In table 1, a priority order of switches is shown. The first switch is the switch chosen by the hashing algorithm to determine a uniform distribution of messages across all of the switches. The second switch is the next switch in the priority order so that should the first switch be not available, the message for a particular transaction is sent to the second switch. In this case, the second switch is located at the same site as the first switch. In other words, in the instance that the first switch is located at Switch Site 1. the second switch also be located at Switch Site 1. The third switch is the next switch in the priority order, so that should the second switch be not available, the message is sent to the third switch. In this case, the third switch has to be located at a different switch site to that of the first and second switches, since there are no other switches available at the switch site of the first and second switches. Finally, the fourth switch is the next switch in the priority order, so that should the third switch be not available, message is sent to the fourth switch.

In this case, the fourth switch (which is the only remaining switch) must be located at the same site as the third switch.

There are two distinct advantages to providing the switches in a priority order like that shown in Table 1. The first advantage is that should one of the first switches fail then the message will be processed by an active switch quickly. This ensures that the transaction request is quickly re-allocated. Secondly, because the second switch in the priority order is at the same site as that of the first switch, this ensures that if the first switch becomes non-operational, messages are sent to a switch which has direct access to the same database 110A, 110B as that of the first switch. This allows processing of the messages to continue as if the first switch were still operational, since the second switch is able to immediately access and update the transaction state records for all pending transactions previously being processed by the first switch. Advantageously, this results in reduced disruption of the transaction processing in the case that one of the switches at a particular switch site becomes non-operational.

In the case that both switchea at a particular switch site become non-operational, the existence of the third and fourth switches in the priority list allows processing of new transactions (that is, transactions for which message M1 is issued after both switches at a particular site have become non-operational) to continue. Advantageously, this allows newly instructed transactions to be carried out even in the case that both switches at a switch site become non-operational (as might occur following a natural disaster at one of the switch sites, for example). However, for transactions which are already part completed at the non-operational switch site, the transaction cannot continue because access to the transaction state data (which is stored on the database 110A, 110B at the non-operational site) is not possible. This situation is discussed in detail later on.

It will be appreciated that the specific priority lists for each switch shown in Table 1 are merely an example, and that alternative priority lists could also be used. Moreover, although the above describes the provision of two switches at two sites, it is envisaged that the principles may be applied to any number of switches at any number of sites.

Improving System Resilience

As already described, in the system 100, the transaction state data of a transaction is stored in the database 110A, 110B of the switch site used to process the transaction. The transaction state data is then used to generate the transaction summary record TS, which is stored and queued in the appropriate message queue unit 112A, 112B until the back office 114 becomes available to receive the transaction summary record TS at the end of the settlement cycle. Following successful storage of the transaction summary record TS in the appropriate message queue unit 112A, 112B, the transaction state data may be deleted from the database 110A, 110B. Furthermore, when the back office 114 confirms to the appropriate message queue unit 112A, 112B that it has successfully received the transaction summary record TS, the transaction summary record TS may be deleted from the message queue unit 112A, 112B.

However, if there is a problem at the switch site at which the transaction summary record TS is stored which prevents the back office unit 114 from being able to access the message queue unit 112A, 112B of that switch site (despite the clustered database arrangement of the message queue omits 112A, 112B), then there is a danger that the transaction summary record TS will not be taken into account at the end of the settlement cycle. This will result in settlement between the banks being calculated incorrectly (and therefore an incorrect transfer of real money between the banks).

In order to alleviate this problem, when each transaction summary record TS is passed to the message queue unit 112A, 112B of its processing switch site, a copy of it is also forwarded to one of the switches of the other switch site for storage at a back-up storage unit (not shown). So, for example, each transaction summary record TS generated at Switch Site 1 and temporarily stored and queued in message queue unit 112A will also be copied forwarded to switch SW3 or SW4 at Switch Site 2 and stored in a back-up storage unit at Switch Site 2. Advantageously, this means that if, for any reason, transaction summary records TS stored in the message queue unit 112A, 112B at a particular site become inaccessible to the back office unit 114 at the end of the settlement cycle (for example, due to a fault with the message queue unit 112A, 112B), then the backed-up copies of the transaction summary records TS can still be retrieved and made available to the back office unit 114 for performing the settlement calculations. Together with the use of a clustered database arrangement the message queue units 112A, 112B, this helps to ensure that settlement between the banks can still be carried out correctly.

As discussed above, in embodiments, the switches are distributed amongst a plurality of sites, with each. site comprising a duster of switches, in the embodiment given in FIG. 1, for example, there are four switches SW1, SW2, SW3 and SW4, with switches SW1 and SW2 forming a cluster at Site 1, and switches SW3 and SW4 forming a cluster at Site 2.

Each of the switches SW1, SW2, SW3 and SW4 operate independently of each other. Therefore, in the case that one of the switches in a cluster fails (due to an error or malfunction, for example), or if one switch in a cluster has to be shut down for maintenance, then transaction processing can still be continued at the other switch in that duster (which, advantageously, has access to the same database 110A, 110B).

This principle extends further than failure of a single switch, in that even if further switches fail, as long as there is at least one switch in the system which is operational, then transaction processing (at least for newly issued transactions) may continue. For example, if a switch at each of Site 1 and Site 2 fails (for example, switches SW1 and SW3), if both switches at a single site fail (for example, switches SW1 and SW2 at Site 1), or even if all switches fail except one (for example, switches SW1, SW2 and SW3 fail, leaving only SW4 operational), then transaction message will be re-routed to an available switch (using the hashing function) and transaction processing will continue.

Furthermore, this principle is not limited to failure of switches. If other components of the system 100 experience a fault (such as one of the storage units 109A-D), then this will be detected by the relevant switch, and the switch will then cause messages to be forwarded to an alternative switch as determined in accordance with the hashing function. The transaction processing thus continues using one of the other switches.

The principle is also not limited to dealing with faults in components. For example, if a switch site is shut down for maintenance (for example, software or hardware updates or the like), then the switches of the site may be unavailable to receive transaction messages. However, the transaction messages can still be received and processed by the switches at the other site, thus allowing the transaction processing to continue. This also applies if an entire site is shut down due to, for example, a natural disaster (such as fire, flooding or the like).

As already mentioned, transaction messages are distributed between the switches SW1, SW2, SW3, SW4 in accordance with the switch priority lists determined by the hashing function. When a switch first receives a transaction message, it applies the hashing function to the message and then forwards the message (if necessary) to the first switch which is understood by the system to be available for processing in the priority list (the monitoring of switch availability via a polling arrangement described in more detail below). In order to forward the message, the original receiving switch attempts to establish a connection (such as a Transmission Control Protocol (TCP) connection) with the first switch in the priority list, and will then forward the message once this connection has been successfully established. If a connection cannot be successfully established (as my occur if, for example, if there is a fault with the first priority switch), then it is determined that the first switch in the priority list is unavailable and an attempt is made to forward the message to the next switch in the priority list which is understood by the system to be available for processing (again, by trying to establish a connection with the next switch the priority list). In this way, the process is repeated until an available switch is found.

For a message M1 (which represents a newly instructed transaction), as long as one switch in the priority list is available to receive the transaction message, then processing of the transaction can be completed by that switch so as to generate the transaction summary record TS. This is because the transaction state data for a particular transaction is first recorded on the basis of the information in message M1, and therefore no previous transaction state data (which is stored in the database 110A, 110B of one of the switch sites) needs to be accessed in order to continue the transaction processing. On the other hand, for a message M3, the processing of the transaction can only be completed if the switch to which the message M3 is forwarded is at the same switch site as the switch to which the message M1 was forwarded (and at which the message M2 was generated). This is because the transaction state data stored at that switch site must be accessed in order to continue the transaction processing. Thus, in the case that both switches at the switch site at which message M1 of a transaction was processed become non-operational before receiving the message M3, the transaction cannot be continued because the transaction state data, which is stored at the non-operational switch site, cannot be accessed. This scenario is described in more detail later on.

In order to reduce wasted network bandwidth, each switch SW1, SW2, SW3, SW4 is configured to periodically poll all other switches so as to ascertain whether or not they are available. This polling comprises sending a test message to each of the other switches, and listening out for a response. If a response from a particular switch is not received within a predetermined time period, then it is determined that that particular switch is unavailable. Messages associated with transactions which are determined to be sent to this switch are then sent to the next switch in the priority list. By periodically carrying out this polling, network bandwidth is not wasted by a switch attempting to establish a connection with an unavailable switch. The time period between polls is determined, so that the extra bandwidth used by polling is more than compensated for by the reduction in bandwidth used by trying to establish connections with unavailable switches. An appropriate time period may be 100 ms, although other periods are envisaged. Polling to switches determined to be unavailable is continued so that, once the switch in question becomes available again, this becomes known to the other switches and messages can then once again be transmitted to the switch which has been made available again.

In this way, a switch determines another switch to be unavailable following a negative polling result (that is, when no response is received) or when a connection attempt with that switch fails. In either case, a message to be transmitted to the unavailable switch will be transmitted to the next available switch according to the priority list. This method can also indicate other problems in the system, for example, failure of the data communication between the switch sites (for example, if both SW1 and SW2 are each unable to connect with or consistently receiving negative polling regarding both SW3 and SW4, then it may be the case that the data communication link between Switch Site 1 and Switch Site 2 has failed). In the event of a problem, maintenance is provided to the failed switch or switch site more quickly than may have occurred without the polling. For example, if no polling is provided, then the failed switch or switch site would only be identified in the event that a message associated with a transaction failed to be correctly transmitted. This may occur much more infrequently than the polling signal.

Figure 2A:
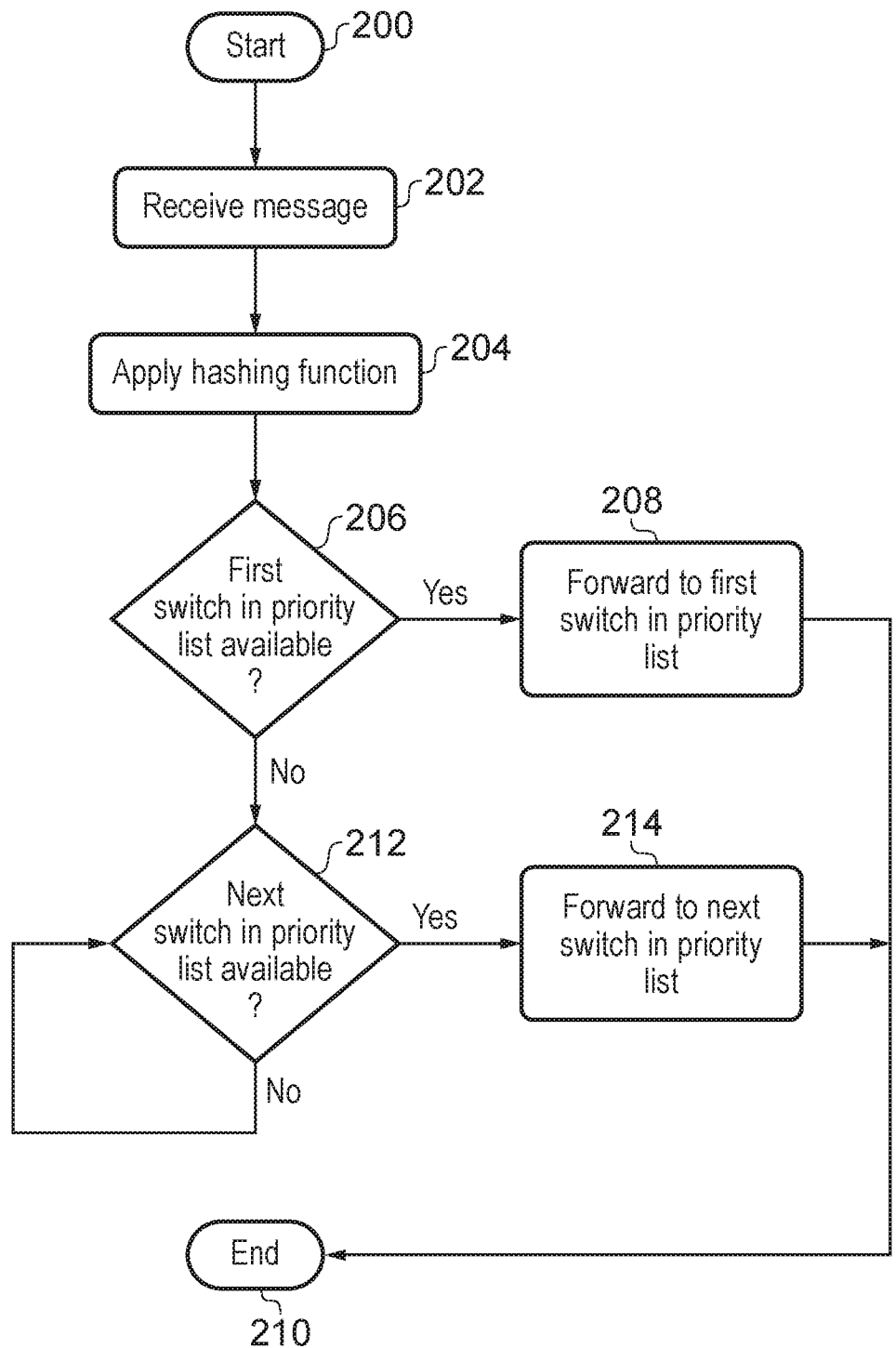
FIGS. 2A-B show a flow chart showing various processing steps applied to a transaction message by a switch forming part of the system, according to an embodiment.
Figure 2B:
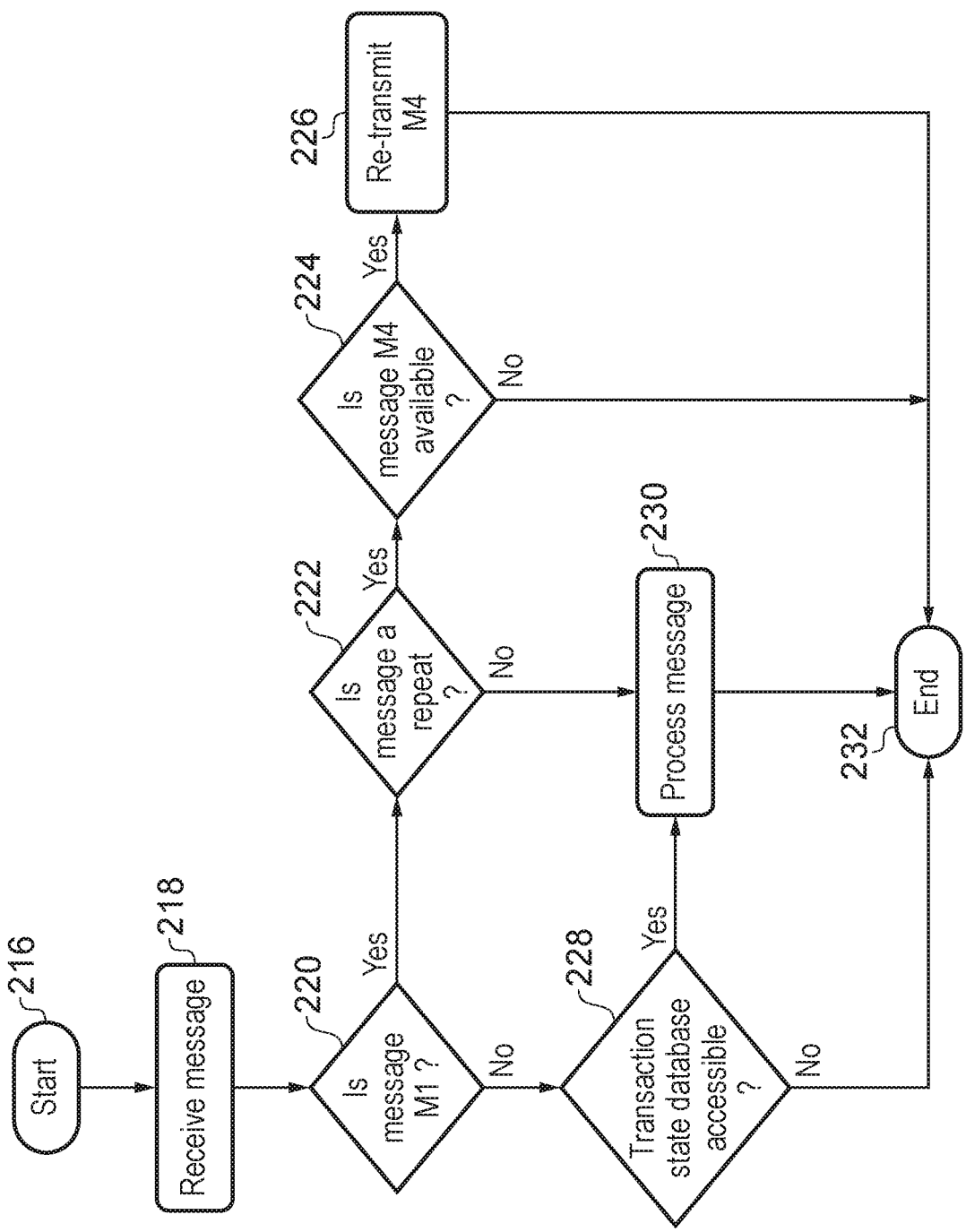

The sending bank (Bank 1 in the example of FIG. 1) will know that the transaction has been completed successfully once it receives the message M4. If the message M4 is not received by the sending bank within a predetermined time period (known as a time-out period), then the sending bank does not know whether or not the transaction has been successful. This time-out can be for a number of reasons. For example, the switch she at which message M1 was processed may have become non-operational prior to completion of the transaction (for example, prior to receiving message M3), meaning that the transaction summary record TS was never created and that a message M4 was never generated. This will be a failed transaction. On the other hand, it may be the case that the transaction was successfully completed and that a message M3 was generated, but that the message M4 was then lost in the system 100 or delayed to the extent that the time-out period expired. In the case in which the message M4 is not received within the time-out period, the sending bank may re-transmit the message M1. FIGS. 2A-B illustrate how the individual switches handle transaction messages, including how the individual switches handle re-transmitted transaction messages from the sending bank.

FIG. 2A shows a flow chart exemplifying a process carried out by a switch which initially receives a transaction message from one of the message queue units 108A, 108B, according to an embodiment.

The process starts at step 200. At step 202, a transaction message (for example, message M1 or M3, as shown in FIG. 1) is received by the switch from the relevant message queue unit 108A, 108B. At step 204, the hashing function is applied to the message, thus identifying a priority list of switches to which the message is to be forwarded. At step 206, it is determined as to whether or not the first switch in the priority list is available to receive the message. This is determined on the basis of either polling the first switch or trying to establish a connection with the first switch, as previously described. If it is determined that the first switch is available, then the process moves on to step 208, in which the message is forwarded to the first switch. The process then ends at step 210. On the other hand, if it is determined that the first switch is not available, then the process moves on to step 212.

At step 212, it is determined as to whether or not the next switch in the priority list is available to receive the message. Again, this is determined on the basis of either polling or trying to establish a connection with the next switch. If it is determined that the next switch is available, then the process moves on to step 214, in which the message is forwarded to the next switch. The process then ends at step 210. On the other hand, if it is determined that the next switch is not available, then step 212 is repeated for the next switch in the priority list (so, for example, if the second switch in the priority list as just been determined as unavailable, then it will be determined, as to whether or not the third switch in the priority list is available). Step 212 will be repeated until an available switch is found, at which point the process will move to step 214 and the message will be forwarded to the available switch. Note that an available switch will always be found eventually if the process of FIG. 2A is carried out, since a switch able to carry out the process of FIG. 2A will, of course, be available for receiving a message.

FIG. 2B shows a flow chart exemplifying a process carried out by a switch which a message is forwarded in accordance with the priority list.

The process starts at step 216. At step 218, the message is received by the switch. At step 220, it is determined as to whether or not the message is the first message relating to a transaction (that is, message M1). If the message is message M1, then the process moves on to step 222, in which it is determined as to whether or not the received message M1 is a repeat of a message M1. A repeat of a message M1 is a re-transmission of a message M1 for a particular transaction from the sending bank, which may occur when the sending bank has previously sent the message M1 but received no message M4 back within the time out period.

The determination of step 222 may be performed by checking the transaction identifier of the message M1. If the message M1 is a repeat, then the original message M1 may have already been processed at the switch site, and therefore the transaction identifier (which is the same for both an original and repeat message M1 for a particular transaction) will have been recorded at the switch site (for example, in the database 110A, 110B as part of the transaction state data). A match of the transaction identifier of the newly received message M1 with a transaction identifier recorded at the switch site will therefore indicate that the message M1 is a repeat. Alternatively, or in addition, a repeat message M1 may include repeat information (for example, in its message header) indicating that it is a repeated message (this repeat information may be added to a message M1 by the banking app 102A, 102B of the sending bank, for example).

In the case that the message M1 is determined to be a repeat, the process moves on to step 224. On the other hand, if no previous messages relating to the transaction with which the message M1 is associated have been processed at the switch site, then it is determined that the message M1 has not been re-transmitted and, rather, is genuinely the first transmitted message associated with a particular transaction. In this case, the process moves on to step 230, in which the message M1 is processed normally.

It is noted that the use of repeat information included in a repeat message M1 is particularly advantageous. For example, consider a scenario in which no repeat information is used and in which an entire switch site becomes non-operational following the receipt of message M3 and the creation of the transaction summary record TS (indicating successful completion of the transaction), but before transmission of the message M4. The lack of a message M4 will cause then sending bank to re-transmit the message M1, which will then be re-routed to the alternative switch site. The alternative switch site will have no record of the transaction identifier (since the transaction summary record TS is stored in the database 110A, 110B of the original switch site) and will therefore not be able to determine the message M1 is a repeat by simply relying on a match of the transaction identifier. The transaction associated with message M1 will therefore be processed as a new transaction at the alternative switch site, even though the transaction was actually already completed at the original switch she (by creation of the transaction summary record TS). This will result in the transaction being incorrectly processed twice (meaning a transfer of twice the amount of money that the sender intended following settlement). However, if the repeat information is used, then this allows a re-transmitted message M1 to be determined as a repeat by any switch at any switch site (rather than only at the switch site at which the original message M1 was processed and the transaction identifier was stored). The use of the repeat information therefore reduces the risk of a message M1 being incorrectly processed as a new message M1 more than once, thus reducing the risk of the same transaction being incorrectly processed more than once.

At step 224, it is determined as to whether or not the message M4 for the transaction with which the repeated message M1 is associated is available at the switch site (for example, if the message M4 is stored in the database 110A, 110B at the switch site). If the message M4 is available, then this implies that the transaction summary record TS for the transaction was created and that the transaction was completed at the switch site. In this case, the process moves on to step 226, in which the message M4 is re-transmitted to the sending bank. This will thus confirm to the bank that the transaction has been completed successfully, even if the originally-transmitted message M4 was not received by the sending bank (or at least not received before the end of the time-out period). The process then ends at step 232.

On the other hand, if the message M4 is not available, then this implies that there is an uncertainty regarding whether or not the transaction has been successfully completed. This may occur if, for example, both switches at the switch site at which a transaction was originally processed (and at which the message M4 will have been generated if the transaction was successfully completed) become unavailable One to a technical fault or the like). In this case, the state of the transaction is not known, and it is not possible to obtain the message M4. The process therefore ends at step 232. The transaction will therefore have to be investigated manually at the end of the settlement cycle (see below).

If a message is not determined to be the message M1 at step 220, then it must be message M3 which has been received from the bank receiving the funds of the transaction. In this case, the process proceeds to step 228 and the transaction may only be completed if the switch carrying out the process of FIG. 2B has access to the transaction state data for the transaction (that is, the switch must be at the same site as that at which the message M1 was processed and which has access to the database 110A, 110B in which the transaction state data is stored). If the switch has access to the transaction state data, then the process moves on to step 230, in which the message M3 is processed normally. This allows the transaction to be completed (resulting in generation of the message M4). The process then ends at step 232. On the other hand, if the switch does not have access to the transaction state data (as will occur if all switches at the site at which the transaction state database is stored become non-operational prior to the issue of message M4), then it is not possible to complete the transaction. The process therefore simply ends at step 232 (and no message M4 is generated).

Thus, it can be seen that if the sending bank does not receive the message M4 confirming that the transaction has been carried out successfully, then the original message M1 instructing the transaction may be re-transmitted by the sending bank. If the message M4 is available (indicating a successfully processed transaction at a switch site which is still operational) but has simply been lost or delayed, then the message M4 will be re-transmitted to the sending bank in response to the repeat message M1. However, if the message M4 is not available, then this indicates that the transaction was either not processed successfully (meaning that message M4 was never generated) or that all switches at the switch site at which the transaction was processed have become non-operational following the generation of message M4 (meaning that message M4 is not available to be resent). In this case, no further processing is carried out on the re-transmitted message M1. This helps to ensure that no transaction is processed twice by the system 100 (thus helping to avoid a situation in which money is debited twice from the sending bank account). In this case, a message M4 will still not be received by the sending bank (despite the re-transmission of the message M1), and the banking app 102A, 102B of the bank can report to the user that the transaction may not have been successful. At the end of the settlement cycle, the internal records of the sending bank, the internal records of the receiving bank and, the transaction summary records TS generated by the system 100 can then be analysed so as to determine the outcome of the transaction and to ensure that all transaction funds are accounted for.

In the above-mentioned embodiment, the time-out period of the sending bank for receiving the message M4 is determined by the skilled person as being a time period in which the message M4 would reasonably be expected to arrive, taking into account the expected processing time of each component in the system 100, any network delay, etc. It will also be appreciated that although, with reference to FIGS. 2A, the steps including "forwarding" a transaction message to an appropriate switch as determined by the priority list, if the switch which receives the message at step 202 actually is the switch which should process the message (according to the priority list), then the transaction message will not actually be forwarded to a different switch. Rather, it will be processed by that same receiving switch.

The above-mentioned features help to ensure that transaction processing can continue reliably and efficiently even if one or more of the components of the system 100 become non-operational. As a further check, at the end of the settlement cycle, prior to the back office unit 114 performing settlement processing using the transaction summary records TS, the total transaction amount (that is, the total amount of money to be transferred) to/from each bank as determined by the transaction summary records TS is checked against corresponding records of the transaction amounts held by the switches (the switch which processes message M1 of each transaction will keep a record of the transaction amount and the sending and receiving bank, for example). If the processing of the messages and the creation of the transaction summary record TS has been carried out correctly, then the total transaction amounts to/from each bank recorded by the transaction summary records TS and the switch records should exactly match. In this case, it is known that settlement processing can be carried out reliably. On the other hand, if there is a discrepancy between the total transaction amounts, then it is known that there has been a problem with the generation of the transaction summary records TS. This can therefore be investigated and rectified prior to the settlement processing.

Thus, in light of the above-described features, it will be appreciated that the system 100 helps to ensure that electronic transactions instructed by banks are not deleted, corrupted or duplicated before being processed at the end of the settlement cycle. This helps to ensure that each instructed transaction is definitely taken into account and is taken into account only once at the end of the settlement cycle. This occurs even if a component of the system 100 experiences a fault, or if there is any planned maintenance on any component or the system 100 which requires that component to be temporarily shut down. At the same time, as long as there is still at least one switch of the system 100 which is operational, then bank account holders may continue to instruct new transactions and experience normal service.

Liability Management

In the system described above, the net settlement between banks is carried out periodically. In other words, real money is transferred between the banks periodically. This means that the transaction summary records TS are promises to pay at the time of settlement. Settlement in this embodiment is carried our separately from this system 100, via a system enabled by a common deposit holding bank such as the Bank of England. Such settlement systems are known to the skilled person. Accordingly, a debit cap is provided depending on the deposits held for settlement. A bank should never be allowed to exceed its debit cap.

In implementing a debit cap in the resilient system of embodiments which are spread across multiple sites, a problem exists. This is explained in FIG. 3A.

Figure 3A:
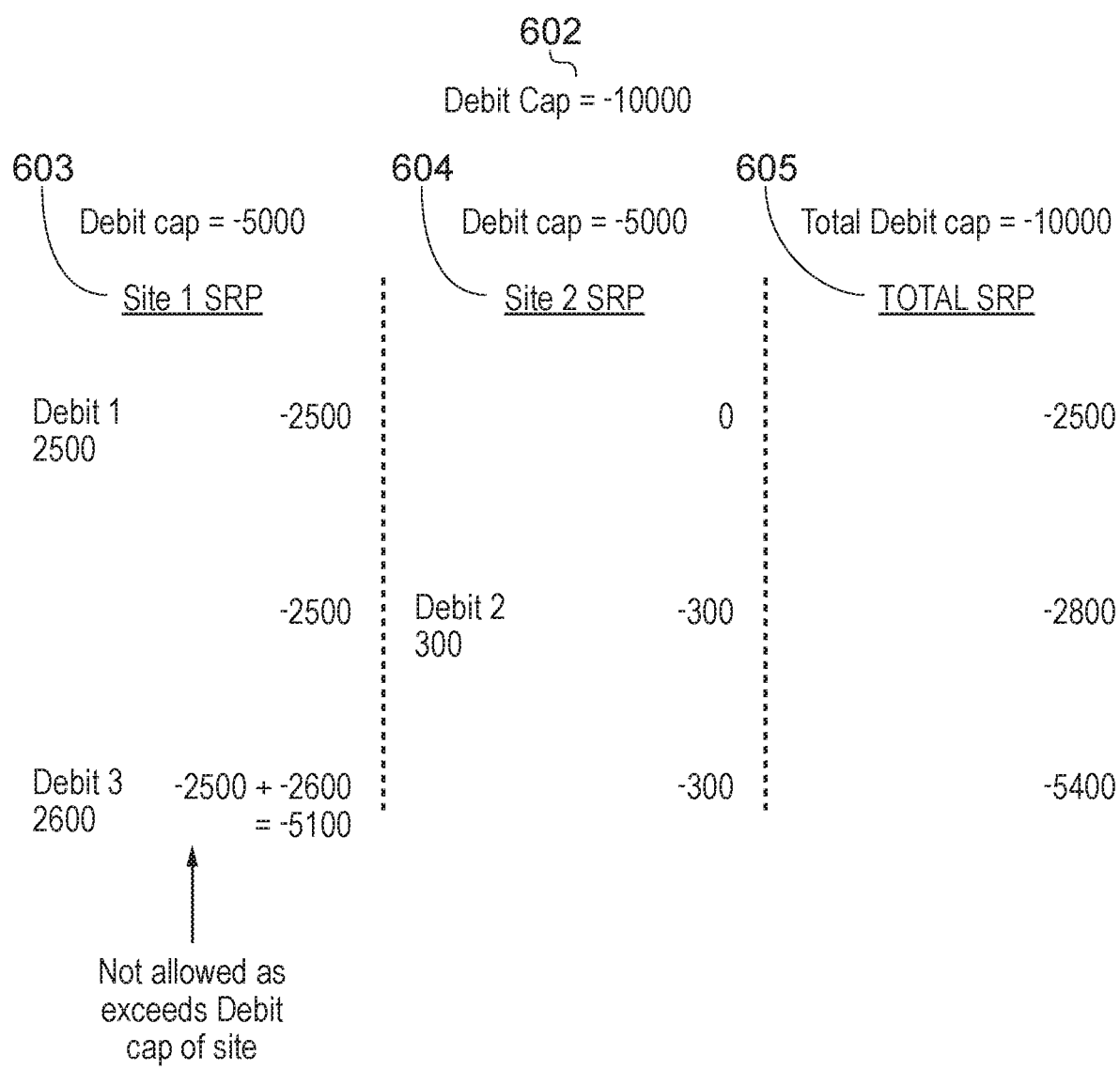
FIG. 3A illustrates a problem associated with implementing a debit cap using the system.

In the example shown in FIG. 3A, let us assume Bank A has a debit cap of −10,000 GBP, 602. As the system 100 is split across Switch Site 1, 603 (also referred to simply as "site 1") and Switch Site 2, 604 (also referred to simply as "site 2") to ensure resilience, the debit cap 602 is split evenly between site 1 and site 2. In each case, the switches at each site record the debit cap for that site. Therefore, in this case, the debit cap at site 1 associated with Bank A is −5,000 GBP and the debit cap stored at site 2 associated with Bank A is also −5,000 GBP. Of course, other divisions are suitable, such as −2,500 GBP for a system that is distributed across four sites and the like.

If we assume that a debit transaction, transaction 1, is processed on site 1. Transaction 1 is a debit transaction for −2,500 GBP, This means that the Settlement Risk Position (SRP), which is a term of Art and means the sum of the transactions which have so far occurred at each site, for switch site 1 is −2,500 GBP. Therefore, the remaining portion of the debit cap available for future transactions (also referred to simply as the "available debits") on site 1 is −2,500 GBP. As no transactions take place in site 2, the SRP for site 2 is 0 and the available debits for bank A in site 2 is still −5,000 GBP. Therefore, the total available debits is −7,500 GBP and the total SRP is −2,500 BP, 605.

Now assuming that a second debit transaction, transaction 2, is processed on site 2 and transaction 2 is for −300 GBP. Therefore, the available debits for site 2 is −4,700 GBP and the SRP on site 2 is −300 GBP, The SRP on site 1 remains at −2,500 GBP and the available debits on site 1 remains at −2,500 GBP, The total SRP for Bank A (i.e. the sum of the SRP at site 1 and the SRP at site 2) is −2,800 GBP and the available debits (i.e. the sum of the available debits for site 1 and 2) for Bank A is −7,200 GBP. Note that the available debit calculations are not shown in FIG. 3A.

We now assume that a third debit transaction, transaction 3, is attempted to be processed on site 1. Transaction 3 is a debit of −2,600 GBP. This means that the SRP for site 1 (should the transaction be processed) will be −5,000 GBP and will therefore exceed the debit cap of −5,000 GBP allocated to Bank A on site 1. Therefore, transaction 3 will be rejected.

However, given that the total SRP for Bank A until the arrival of transaction 3 was only −2,800 GBP and so the total available debits for Bank A is −7,200 GBP, transaction 3 should be processed. This means that the provision of the additional resilience to technology failures stops transactions that should otherwise be allowed. Embodiments aim to address this issue as now explained.

FIG. 3B shows an example according to embodiments of the disclosure. In the example, the debit cap 651 remains at −10,000 GBP. Similar to the example shown in FIG. 3A, in the example of FIG. 3B, the debit cap 651 is split equally between the two sites. In other words, site 1 has a debit cap of −5,000 GBP and site 2 has a debit cap of −5,000 GBP.

In a similar example to that of FIG. 3A, transaction 1 arrives at site 1 and is a debit of −2,500 GBP. Accordingly, the SRP at site 1 for Bank A is −2,500 GBP and the SRP for Bank A at site 2 is 0 meaning the total SRP for Bank A across both sites is −2,500 GBP. Further the available debits of site 1 reduces to −2,500 GBP and the available debits of site 2 remains at −5,000 GBP. The total available debits is therefore −7,500 GBP. Note that the available debit calculations are not shown in FIG. 3B.

Transaction 2 then arrives at site 2 and is a debit of −300 GBP. Accordingly, the SRP of Bank A at site 1 remains at −2,500 GBP, the SRP of Bank A at site 2 is −300 GBP and so the total SRP is −2,800 GBP. Moreover, the available debits of site 2 reduces to −4,700 GBP and the available debits of site remains at −2,500 GBP. The total available debits for Bank A is therefore −7,200 GBP.

As explained with reference to FIG. 3A, if transaction 3 (a debit of 2,600 GRP) arrived at switch site 1, the transaction will be rejected as the SRP of site 1 would exceed the debit cap of 5,000 GBP allocated to site 1. In order to avoid this problem, periodically an adjustment cycle is carried out within the system. Specifically, the adjustment cycle 656 is periodically carried out by the switches at sites 1 and 2. The adjustment cycle comprises calculating an adjustment value by summing together the current magnitudes of the SRP at each site. That is, the current magnitude of SRP1 of −2,500 GBP and the current magnitude of SRP2 of −300 GBP are summed together to give −2,800 GBP. This sum is then averaged out across the number of sites. In this case, the mean average over the two sites is −2,800/2=−1,400 GBP, Of course, other averages, such as median average or the like may be used. The purpose of determining the average SRP across all the sites in the system (in this case, sites 1 and 2), effectively balances the liabilities of the bank between all the switch sites. This means that if one switch site receives very large value transactions compared to the other switch sites, then the debit cap of system 100 will not be exceeded (unless the debit cap for the bank across all switches is exceeded).

In order to calculate the adjustment value to be applied to a particular switch site, adjustment_site, the following equation is used:

$$adjustment\_site = averaged\_SRP - SRP$$

Where adjustment_site is the adjustment value to be applied to a particular switch site; averaged_SRP is the average of the SRP across the switch sites in the system and SRP is the SRI' at a particular switch site.

Using this equation, it will be seen that the adjustment at site 1=−2800/2−(−2500)=+1100 and the adjustment at site 2=−2800/2−(−300)=−1100

Therefore, the SRP of a particular site is adjusted by the adjustment value. This adjustment value does not affect the total SRP for the Bank (thus not allowing the Bank to exceed the overall debit cap). Instead, the adjusted SRP value is used to spread the liability of the Bank across all the switch sites.

More formally, the adjusted SRP=SRP value+adjustment_site

So, in the case of FIG. 3B, after the adjustment cycle is run, the adjusted SRP for site 1=−2500+1100=−1,400 GBP and the adjusted SRP for site 2=−300+−1100=−1,400 GBP. In other words, the effective SRP at each site is the same.

If the sum of the adjusted SRP and the new transaction does not exceed the debit cap on the site, then the new transaction is approved. However, if the sum of the adjusted SRP and the new transaction does exceed the debit cap on the site, then the new transaction is rejected.

Now, by referring to FIG. 3B, using the adjusted SRP of site 1 (−1,400 GBP), and the amount of trans 3, the new transaction, (−2,600 GBP), the total is −4000 GBP. This does not exceed the −5,000 GBP debit cap of site 1, and is therefore allowed by the system 100. Thus, in this way, the adjustment values of each site are used so as to reduce the chance of a valid transaction amount (that is, a transaction amount allowed by the total debit cap) being rejected on the basis of the available debits at an individual switch site.

In embodiments, the adjustment cycle (to calculate a new adjustment value) takes place periodically. The period may be temporal, for example every 20 or 30 seconds, or may be alter a site has handled a certain number of transactions or even when the SRP at a site exceeds a predetermined amount.

In the event of a failure of a site, the debit cap at each remaining site can be increased so that the full value of the debit cap is available. So, for example, if site 2 were to fail, then the full −10,000 GBP debit cap could be allocated to site 1 so that the processing of transactions of a total amount up to the value of the full debit cap can continue.

It is noted that the actual SRP value for each site (so, in the present example, −5100 for site 1 and −300 for site 2, after all transactions in FIG. 3B have been carried out) is important because the SRP value at a site is equal to the amount of money owed to (if the SRP is positive) or owed by (if the SRP is negative) a bank following transactions at that site. The actual SRP value at each site must therefore remain unchanged so that it may be used to ensure that settlement has occurred correctly. The actual SRP value for each site at any given time is therefore still stored at its respective site, even though it is the adjusted SRP value which is used in ensuring that the total debit cap is not exceeded. It is noted that in order to keep the SRP at each site as accurate as possible, it will be updated for a sending bank following successful processing of message M1 and updated for a receiving bank following successful processing of message M3.

Gateway Application

As already discussed, the gateway 104A, 104B of each bank helps control the transfer of messages between that bank and the switches SW1, SW2, SW3 and SW4. Each gateway 104A, 104B performs a number of functions on behalf of both its bank and the switches so as to reduce the processing strain at the banks and switches. It is noted here that the use of the gateway application within the overall system is optional. However, if the gateway is optionally not used, the Banking App 102A, 102B must be capable of carrying out structural validation (see below—in particular, step 906 of FIG. 4), message signing, transmission and verification (again, see below—in particular steps 910, 912 and 914 of FIG. 4), routing of messages and adding of message M1 repeat information (where appropriate—see above) with similar functionality.

One function of the gateway relates to when a bank (under the instruction of an account holder at that bank) wishes for a transaction to be processed by the system 100. Each bank will generally use a different proprietary system for managing its accounts and for allowing its account holders to it transactions and the like. However, for reasons of efficiency, transaction messages processed by the switches must conform to a certain standard structure (or format, such as the ISO20022 standard, as already discussed). Thus, any transaction message generated by an account holder at a bank must take the form of a standard type transaction message in order for it to be accepted by the switches. Furthermore, for reasons of security, it is necessary that any transaction message transmitted between a bank and the switches is digitally signed and verified (using a digital signature) so as to ensure that it has genuinely source of the message is legitimate.

The checking of the structure of transaction messages is carried out by the gateway. Furthermore, the signing of messages to be transmitted from the bank to the switches (these messages subsequently being verified by the receiving switch) and the verification of messages transmitted from the switches to the bank (these messages being previously signed by the transmitting switch) is implemented using the gateway. That is, the gateway of a bank provides a transmission interface between the proprietary system of that bank and the switches so as to ensure that transaction messages are digitally signed and verified and conform to the required standard structure. Any suitable standard for the transaction message structure and the digital signing and verification may be used. Such standards are known to the skilled person. An example method for digital signing and verification makes use of a hash of the message data (hashed using SHA1) which is then encrypted (using RSA encryption) for transmission. In embodiments, transaction messages to be processed by the gateways 104A, 104B are queued, respectively, message queues 106A, 106B. If the gateway 104A and 104B were not provided, the banking application 102A and 102B would need to provide this functionality.

The gateway also routes messages to the switch sites by adding routing information to the header of each message which is then read by the message queues 106A, 106B, 108A, 108B in order to direct the message to the appropriate switch site. For example, in the example of FIG. 1, the message queue 108A may be labelled MQ1 and the message queue 108B may be labelled MQ2. The label MQ1 or MQ2 is therefore added to the header of each message to be transmitted to a switch site by the gateway so that the message queue 104A, 106B can direct the message to the appropriate switch site. It is also envisaged that a single bank could have multiple bank-side message queue units 106A, 106B (for example, Bank 1 could have multiple bank-side message queues 106A1, 106A2, 106A2, . . . not shown) and that the routing information added by the gateway could include information identifying which of the bank-side message queue units the message is to be directed to. Advantageously, this helps with data load balancing in the system 100.

Figure 4:
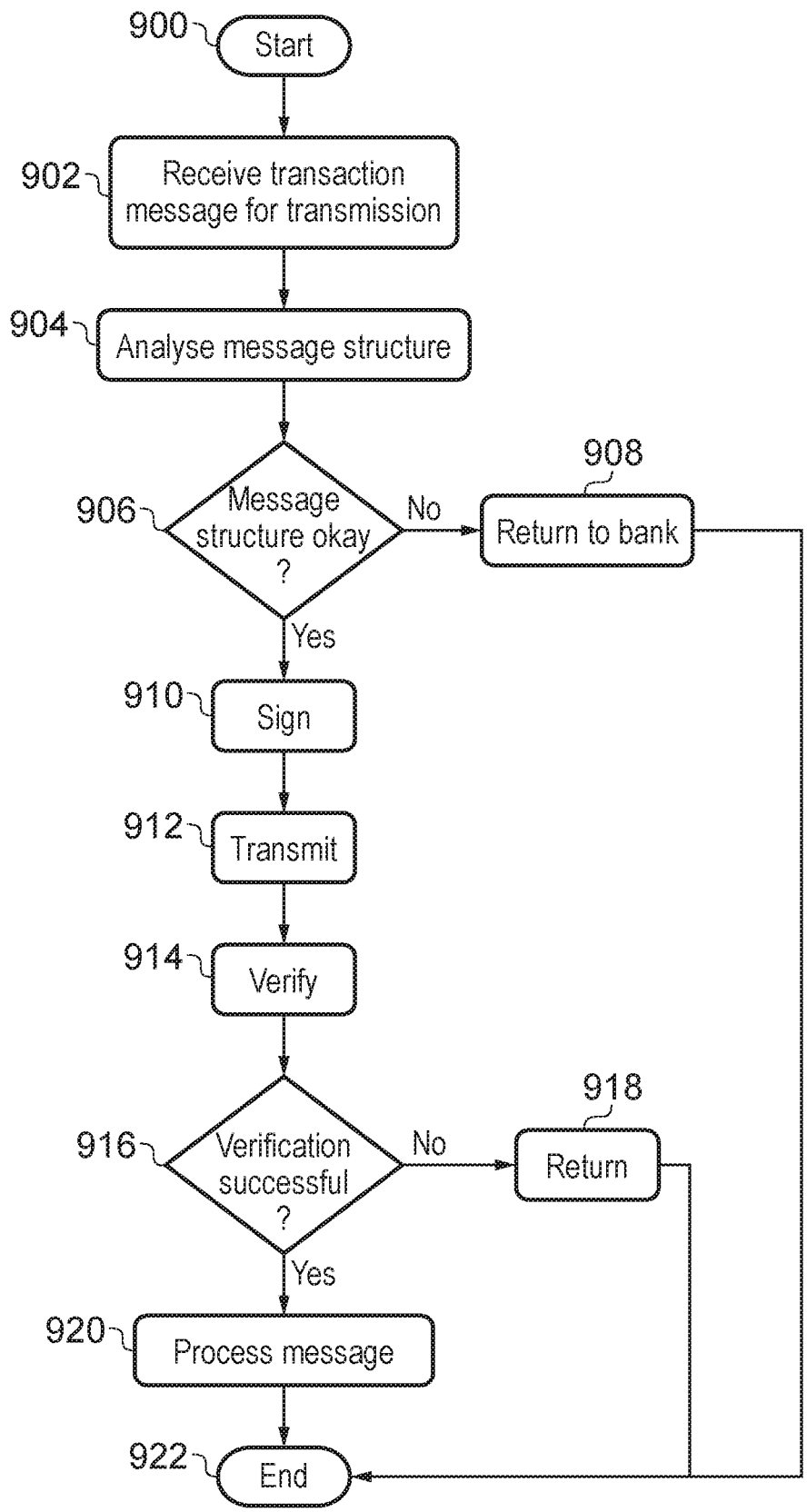
FIG. 4 shows a flow chart showing various processing steps applied to a transaction message by the system, according to an embodiment.

As an example embodiment, the operation of the gateway 104A for Bank 1 and of a switch, when a message is transmitted from Bank 1 to the switch, is described with reference to the process shown in FIG. 4. The process starts at step 900. At step 902, the gateway 104A receives a transaction message from the Banking App 102A of Bank 1 that is to be transmitted to one of the switches for processing. At step 904, the gateway 104A analyses the structure of the transaction message. In particular, the gateway 104A ensures that the message has the standard structure necessary for processing by the switches. This includes ensuring that all necessary information is included in the message. For example, if the message instructs payment of funds from an account of Bank 1 to an account of Bank 2, it is ensured that the payment amount and currency, the bank sort code and account details of Bank 1 and the bank sort code and account details of Bank 2 are all present in the message and in the correct format (since this information is required in order for the transaction to be completed). It also includes checking whether not the message includes a unique transaction identifier and whether the message includes suitable routing information.

At step 906, if it is determined that the message structure conforms to the standard, then the process moves onto step 910. On the other hand, if it is determined that the message structure does not confirm to the standard (for example, if some essential information is missing from the message), then the process moves onto step 908. At step 908, the message is transmitted back to Bank 1 with an error message. The error message informs Bank 1 that the transaction message did not conform to the message standard and that it must be resent with the error rectified (for example, with any missing information added). The process then ends at step 922.

At step 910, the transaction message is signed with a digital signature of Bank 1. The digital signature allows the receiving switch to guarantee the authenticity of the message (i.e. that the message originates at Bank 1). At step 912, the transaction request is then transmitted over the data communication channel between Bank 1 and the appropriate switch site (as determined by the routing information). It is noted that the gateway is implemented by circuitry running software stored on a storage medium (not shown) at the site of Bank 1. Advantageously, this arrangement allows the checking and transmission of the transaction message to be completely handled by the gateway circuitry, thus reducing the processing load both at the proprietary system of Bank 1 and the switch site. This is because messages that do not contain the correct information are not forwarded onto the switch site. Moreover, it is envisaged that should the gateway not be provided in a system as may be the case), the bank application will provide digitally signed messages that contain all the relevant information and that are provided in the appropriate format.

Once the message is received by a switch at the switch site, it is verified using the digital signature. This occurs at step 914. As already discussed, the digital signing and verification steps (steps 910 and 914, respectively) help to guarantee that any transaction message received by the switch is genuinely from one of the banks signed up to use the system 100. The signature verification may occur at the switch which first receives the message or, alternatively, the switch (if any) to which the message is forwarded.

At step 916, if the verification of the digital signature is successful, then the process moves on to step 920, at which point the transaction message is processed by an appropriate switch (as already described). The process then ends at step 922. On the other hand, if the verification of the digital signature is not successful, then this implies that the transaction message may have an error or the like associated with it. The process therefore moves on to step 918, in which the transaction message is returned to the sending bank. In this case, information indicating that there was an error in the verification process is generated by the switch which performed the verification and returned with (or as part of) the transaction message. Advantageously, this notifies the sending bank that there was a problem with the transaction message, and the sending bank can therefore investigate this. The process then ends at step 922. Advantageously, the verification of the digital signature of all incoming transaction messages also helps prevent counterfeit or fraudulent messages (e.g. from an unauthorised party trying to instruct a transaction) from being processed.

Thus, the use of the gateway helps to guarantee that all transaction messages received by the switches for processing are of the correct standard structure. The switches therefore only have to be configured to deal with this single standard structure (rather than a plurality of different message structures generated from different banks), thus improving the efficiency of the system 100. Furthermore, because messages are only actually transmitted across the network from the banks to the system 100 if they conform to the correct message structure, network bandwidth is not wasted on sending messages which do not have the correct message structure (and which would therefore be rejected) to the switches. As a further advantage, the digital signature signing and verification implement by the gateway and switches helps to improve the security of the system.

As already mentioned, in embodiments each gateway 104A, 104B is implemented by circuitry running software stored on a storage medium (not shown) present at the location of its associated bank. This software will be functionally separate to any software which implements internal functions at each bank (for example, the system at each bank for managing accounts and the Banking App for allowing account holders to instruct transactions and the like) and any software which implements internal functions at the switch sites (for example, any software implemented by the switches SW1, SW2, SW3, SW4, the message queues 108A, 108B, etc.). Advantageously, this allows the benefits of the functions of the gateway to be realised (increased efficiency and security, as discussed above) without increasing the core processing load at the banks or at the switch sites.

The second function of the gateway 104A, 104B relates to monitoring which of the banks and which of the switch sites are available for sending and receiving messages and for data load balancing of the system 100.

If a message is not delivered to a switch site via the relevant message queue units 106A, 106B, 108A, 108B within a predetermined time period, then the relevant message queue unit adds information to the message header indicating that the collect time expired and returns the message to the gateway. This can occur because, for example, either the message queue unit 108A, 108B of the switch site fails to pick up the message from the relevant message queue unit 106A, 106B within the predetermined time period, or because a switch at the switch site fails to pick up the message from the relevant message queue unit 108A, 108B within the predetermined time period. There may be a variety of reasons behind this, including a failure of the message queue unit 108A, 108B at the switch site, a failure of the switches or a network failure. In this case, the gateway re-transmits the message to the alternative site. So, for example, if neither SW1 and SW2 at Switch Site 1 pick up a message within the predetermined time period, then, upon receiving the message back, the gateway of the instructing bank will re-route the message to Switch Site 2. A problem with this, however, is that if, for example, both switches at a particular switch site are down for an extended period of time, then this method of re-routing messages is very processor intensive and wastes network bandwidth. This is because messages are continually being sent to an inactive site only for error messages to subsequently be returned.

Similarly, the internal systems at one or more of the banks may also temporarily become unavailable for receiving messages. For example, in the example of FIG. 1, Bank 2 may become unavailable for receiving a message M2 informing Bank 2 to expect a payment of thuds from Bank 1 in the case that as transaction message M1 is issued by an account holder at Bank 1 to pay an account holder of Bank 2. In this case, a message M3 is not received from Bank 2 following transmission of the message M2 to the banking app 102B, and the transaction therefore cannot be completed. Again, however, if Bank 2 is unavailable for an extended period of time, then this method of continuing to send messages M2 to Bank 2 is a problem because it is very processor intensive and wastes network bandwidth. This is because messages are continually being sent to an inactive bank.

In order to alleviate these problems, the gateway 104A, 104B of each bank is configured to keep track of which other banks and which switch sites are available to receive messages. This is defined as the availability cache.

With regard to monitoring switch sites, a gateway does this by sending a test message to a switch site over the network via the message queue unit 108A, 108B of that switch site and listening for an echo of that message coming back from the switch site. A gateway will typically do this if it has not received a message from a particular switch site for a certain period of time. An echo (more specifically known as a remote echo) is a copy of the test message sent to the switch site which is transmitted from the switch site back to the gateway. The echo is generated by one of the switches at the switch sites in accordance with instructions comprised within the test message. If, in response to sending the test message to a particular switch site, the gateway receives an echo of that message within a predetermined time period (for example, a period of time equal to the time-out period for receiving a message M4), then the gateway knows that the switch site is still available to receive messages via its message queue unit 108A, 108B. On the other hand, if no echo is received, then the gateway determines that the switch site is not available for receiving messages (perhaps due to a fault) via its message queue unit 108A, 108B, and therefore prevents father messages from being transmitted to the switch site via this route.

In the event that the gateway transmits a test message to a switch site in the way described above and, after a predetermined period of time, receives no echo back, the gateway determines that communication with the switch site via its message queue unit 108A, 108B is unavailable. This is because, if this route were available, then the test message would have eventually arrived at a switch at the switch site, and that switch would have generated a copy of the test message to be transmitted back to the gateway as an echo. In the case that no echo is received, the gateway no longer routes messages to the switch site via its message queue unit 108A, 108B. In other words, the switch site is determined to be unavailable. The gateway therefore controls the subsequent distribution of messages once one of the switch sites is determined to be unavailable.

The gateway will also determine that a switch site is unavailable if a message M1 is returned to the gateway from a switch site because it was not picked up by a switch at the switch site within a predetermined time period (see above description). Again, in this case, the gateway will no longer route messages to this switch site via the message queue unit 108A, 108B at that site.

To be clear, it is noted that if a switch site is determined to be unavailable by the gateway, then this does not necessarily mean that the switches at the switch site are unavailable. Rather, it implies that messages cannot be transmitted to the switches at the switch site via the message queue unit 108A, 108B at that switch site. For example, it may simply be the case that there is a network failure which prevents messages being transmitted to the switches at a particular switch site via its message queue unit 108A, 108B, but that the switches at the switch site are still completely functional. In this case, messages may still be routed to the switches via the other switch site and the inter-she data communication link (for example, in accordance with the hashing function).

When a switch site has been determined to be unavailable (either due to a lack of echoes being received at the gateway or due to a message M1 being returned to the gateway), test messages are periodically sent to the switch site via its message queue unit 108A, 108B so as to determine whether or not it has become available again. If the switch site remains unavailable, then no echoes will be received, and messages will therefore continue not to be sent to the switch site. On the other hand, if the availability of the switch site is restored (for example, following completion of repair or maintenance), then, when the next test message is seat to the switch site, a return echo will be received. In this case, the gateway determines that the switch site is once again available, and allows messages to once again be transmitted to that switch site via its message queue unit 108A, 108B. The gateway will also determine that a switch site determined to be unavailable is available again in the case that a transaction message (for example, a message M2) is received from that switch site (since such a message could not be received if the switch site were still unavailable). With regard to monitoring other banks, the gateway of a bank relies on information generated by the switches and/or from information which can be deduced from the receipt of message M4 for transactions to certain banks.

More specifically, each of the switches may periodically send a test message to each of the banks using the system 100 and wait to receive an echo from each of these banks.

If an echo from a particular bank is not received within a predetermined time period at a particular switch, then it is determined that the bank is unavailable for receiving messages from this particular switch (perhaps due to a faulty network connection between this switch and the bank). In this case, messages M2 to be transmitted to the bank from this switch will be re-routed via an alternative route (for example, via the other switch at the switch site or even via one of the switches at the alternative switch site via the inter-site data connection). It is noted that, in this case, the switch itself is still operational and can therefore still receive messages in accordance with the hashing function and process these messages. The only problem is the actual transmission of messages M2 to the bank in question, which is overcome by the re-routing described here. Note that this does not apply to message M4, since, as already described, message M4 must be transmitted back to the sending bank issuing the transaction request via the same switch at which the message M1 was originally received (not the switch determined by the hashing function). In the case that the connection between this original switch and the sending bank is down, message M4 cannot be transmitted to the sending bank via this switch. The system must therefore wait for a re-transmission of the message M1 from the sending bank which, in the case that the connection between the original switch and the sending bank remains down, will be routed to an alternative receiving switch which does have a connection with the sending bank via the appropriate messages queues 106A, 106B, 108A, 108B. This repeat message M1 will then be forwarded to the processing switch (in accordance with the hashing function), resulting in the re-transmission of message M4 and the transmission of this message M4 back to the sending bank via the alternative receiving switch.

In the case that all switches fail to receive an echo from a particular bank, it is determined that the bank as a whole is unavailable (that is, it is not available to receive messages from any switch), and information indicating this is relayed back to the gateway of all other banks.

In addition, in the case of, for example, planned maintenance of a bank's internal systems, each bank which uses the system 100 is able to disconnect from the system 100. In this case, the bank will purposely disconnect (or, in other words, sign off) from the switches, and one or more of the switches will relay information to the gateway of all other banks indicating that the bank which has signed off is unavailable.

Furthermore, in the event that a bank is unavailable (due to a lack of echo responses to test messages from all switches or due to being signed off), a switch which receives a message M1 instructing a transaction of funds to the unavailable bank can generate a message M4 and transmit this message M4 back to the sending bank. This message M4 is different to the usual message M4 indicative of a successful transaction because it contains information to inform the sending bank that the receiving bank is n available and that the transaction was therefore not processed successfully (in this case, the debited account at the sending bank may be re-credited). In particular, this message M4 will contain data indicating the reason for the transaction being rejected (for example, a reason code indicating a network failure at the receiving bank, as indicated by a lack of echoes being received, or a reason code indicating that the receiving bank has signed off). The gateway at the sending bank may therefore use this message M4 to determine that the receiving bank is currently unavailable. It is noted that the switches will be aware of an unavailable bank due to a lack of echoes being received or due to the bank signing off from the switches, as previously discussed. Although the determination by the switches that a bank is not available through the use of echoes or through the bank sign-off procedure will be relayed to each of the other banks, the use of a message M4 to indicate a failed transaction request to a particular bank provides a further way for other banks to be made aware of this unavailability (which can be advantageous, for example, if there is a delay in the standard relaying of this information by the switches).

The gateway of each bank will keep a record of each other bank's availability (for example, Bank A: available, Bank B: available, Bank C: unavailable) in accordance with the information relayed by the switches (this information being based on the use of echoes and/or the bank sign off procedure) and/or the receipt, of messages M4 indicating that a particular bank is unavailable. This record forms part of the availability cache held at each bank (the availability cache also including information regarding which switch sites are available). Because of this record, bandwidth wasted by attempts to send messages to unavailable banks is reduced. For example, when Bank A's customer requests a new transaction of funds intended to a bank determined to be unavailable (Bank C, for example, in this case), the gateway will then reject this so that a message M1 is never sent, and the bank account holder will be notified by the banking app of Bank A that the receiving bank (Bank C) is currently unavailable. The amount of bandwidth wasted by sending transaction messages through the system 100 to an unavailable bank is therefore reduced.

When a bank has been determined to be unavailable via the use of echoes as discussed above), test messages may periodically be sent to the available bank so as to determine whether or not it has become available again. If the bank remains unavailable, then no echo will be received, and messages will therefore continue not to be sent to the bank. On the other hand, if the availability of the bank is restored (for example, following re-establishment of a failed network connection), then, when the next test message is sent to the bank, a return echo will be received. In this case, the gateway determines that the bank is once again available, and allows messages to once again be transmitted to that bank.

If a bank has been determined to be unavailable due to it signing off from the switches, then the bank will remain unavailable until it reconnects with (or, in other words, signs on to) the switches again. Once the bank has signed back on to the switches, one or more of the switches will relay information to the gateway of all other banks indicating that the bank is once again available.

In general, test messages may be periodically sent to each of the banks by the switches with a time period sufficiently small so as to try to minimise the number of transaction messages sent to a bank which is unavailable, thus saving bandwidth. At the same time, the time period should not be so small that test messages are being sent so frequently that they use too much network bandwidth and thus reduce the efficiency of the network (effectively countering the bandwidth saving effect of using the test messages and echoes in the first place). As an example, the time period between test messages sent to a particular bank may be between approximately 5 and 30 seconds. Of course, this could be varied as would be understood by the skilled person.

In an embodiment, the gateway sends a plurality of test messages prior to determining that a switch site is unavailable. Similarly, each switch sends a plurality of test messages prior to determining that a particular bank is unavailable. For example, for an arrangement in which the time period between transmitting test, messages is 30 seconds, the gateway or switch may send a first test message and listen out for an echo. 30 seconds later, if an echo has not been received, then the gateway or switch will send a second test message and listen out for an echo. 30 seconds later, if an echo has still not been received, then the switch site (in the case of the gateway sending the test messages) or the bank (in the case of the switches sending the test messages) to which the test messages were transmitted is determined to be unavailable, and the transmission of transaction messages to that switch site or bank is suspended. By sending a plurality of test messages prior to determining that a switch site or bank is unavailable, it helps to ensure that the transmission of transaction messages to a functioning switch site or bank is not suspended in the case that a returning echo from that switch site or bank is subjected to, for example, to a network delay or the like.

Advantageously, because of the availability cache kept by the gateway of each bank, transaction messages are not sent to banks or switch sites which are determined to be unavailable, and therefore a reduced number of attempts are made to transmit messages to switch sites or banks which cannot accept messages. As well as this reducing the risk that messages become corrupted or lost, this also means that processing and network capacity are not wasted with messages which cannot be delivered. Processing and network efficiency are therefore improved.

In addition, it is noted that there is often a predetermined limit imposed by the banks on the amount of time that a transaction should take. That is, the time between the sending of the initial message M1 and the receiving of the message M4 by a bank should be no more than a predetermined time limit. Any suitable time limit may be set, although, typically, it will be set at around 5 to 15 seconds. It is therefore important to ensure that transaction messages are transmitted through the system as efficiently as possible in order to help ensure that the transaction is completed within this time limit. Advantageously, because of the use of the availability cache at each bank, time is not wasted by attempting to send transaction messages to the switches via switch sites which are unavailable (which would result in the message being returned and having to be re-routed, thus wasting time). Similarly, because each switch keeps a record of the routes to each bank which are available (in accordance with the test messages sent to and echoes received from each bank), time is not wasted by attempting to send transaction messages to banks via unavailable routes. Also, because each switch polls the other switches for their availability, time is not wasted by attempting to send transaction messages to non-available switches. All of these features thus help to ensure that transaction messages are transmitted efficiently around the system 100 and that the transaction can be completed within the time limit determined by the banks.

As a further advantage, by use of the gateway for monitoring the availability of switch sites and bank and for issuing instructions, this processing is offloaded from the banking apps 102A, 102B. The overall processing efficiency at the banks is therefore improved.

Figure 5:
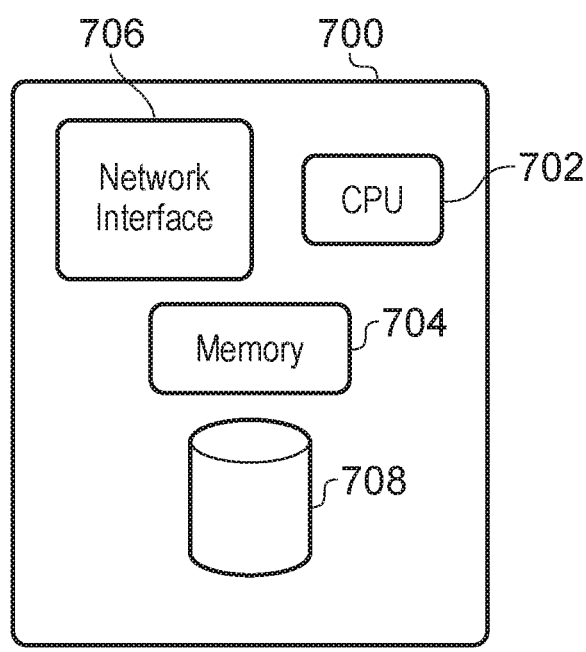
FIG. 5 shows a computer according to an embodiment.

FIG. 5 illustrates a computer 700 for use with the system 100. In an embodiment, the functions carried out by each element of the system 100 (that is, the banking apes 102A, 102B, the gateways 104A, 104B, the message queue units 106A, 106B, 108A, 108B, 112A, 112B, the switches SW1, SW2, SW3, SW4, the databases 110A, 110B and the back office unit 114) are implemented by one or more such computers 700. These computers may also be servers (which themselves may be physical servers or may be virtual servers). The computer 700 is controlled by central processing unit (CPU) 702, the CPU 702 being configured to process instructions held in memory 704. Data communication with the computer 700 occurs via the network interface 706. The computer 700 also comprises a storage medium 708 (such as, a hard disk drive, solid state memory or tape drive) for storing data.

Although the system 100 has been described with respect to processing financial transaction messages, it will be appreciated that the system 100 could be used for processing and storing any kind of data unit which must be managed so that, during any further processing, each data unit is definitely taken into account and is taken into account only once.

In this case, for whatever type of data unit is used, the system 100 will help to ensure that any deletion, corruption or duplication of a data unit is avoided.

For example, the system 100 may be used to process and store data generated during scientific or engineering experiments prior to analysis of this data. In this case, each data unit may be an individual experimental measurement, for example. Such data units are often very difficult or costly to obtain, and therefore it is important to avoided deletion or corruption of the data. Furthermore, for the subsequent analysis, it is important that data is not duplicated, as this may cause incorrect conclusions to be derived from the analysis. Thus, the use of the system 100 would be beneficial for managing this kind of data.

Although the foregoing has been described with reference to a bank, the disclosure also relates to any financial institution that transacts money such as a credit card company or the like.

It is noted that a particular advantage of the above-described system 100 is that, whilst the components of the system are arranged so as to make the system resilient (meaning that the system can continue to reliably process transactions even if certain components of the system become non-operational), the fact that, once a transaction message has been received by a switch (as determined by the hashing function), it is stored and processed at a single site prior to transfer to the back office unit 114 means that latency in, the system (due to transfer of the transaction message between diff rent components at different sites) is reduced. The latency of the system thus remains low, even though the resilience of the system is increased.

It will be appreciated that, although FIG. 1 shows two banks, two switch sites and two switches for each switch site (for ease of explanation), embodiments of the invention are not limited to this. In reality, there may be a large number of banks configured to use the system 100, each having the configuration shown in FIG. 1 for Bank 1 and Bank 2 (that is, comprising a banking app, a gateway and a message queue unit). There may also be more than two switch sites configured in the same way as Switch Sites 1 and 2 (with each switch site being in data communication the other switch sites and with each of the banks). Furthermore, each switch site may comprises more than two switches, each configured to store transaction messages in the same database so as to enable the processing of messages associated with the same transaction using any of the switches at a particular site. The skilled person will appreciate bow the system 100 as described with reference to FIG. 1 could extended so as to include larger numbers of banks, switch sites and/or switches.

Although the foregoing has been described with reference to a transaction requests, the disclosure is not so limited and any kind of electronic message is envisaged. Further, although the foregoing has been described with reference to the transaction requests being stored temporarily in the message queue 106A before being sent to the gateway 104A. the disclosure is not so limited. For example, the banking application 102A may communicate directly with the gateway 104A without holding the transaction request in the message queue 106A. This may be achieved by having a buffer within the gateway 104A which stores the transaction requests until the transaction request can be serviced by the gateway 104A.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a no transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A system for receiving transaction requests from an entity and facilitating settlement of funds associated with the transaction requests, the system comprising multiple switch sites each including multiple switches, the multiple switches of each of the multiple switch sites configured to communicate with one another via a network to process messages associated with the transaction requests from the entity, each of the multiple switch sites further including:
   a storage unit configured to store:
     a settlement risk position specific to the switch site, the settlement risk position including a sum of transaction amounts for ones of the transaction requests from the entity previously processed by the switches of the switch site over a period of time;
     a debit cap specific to the switch site, wherein the debit cap is based on a total debit cap associated with the entity and a number of the multiple switch sites; and
     a new transaction request having a transaction amount;
   communication circuitry configured to receive an adjustment value over the network and to generate the settlement risk position specific to the switch site based on the adjustment value, wherein the adjustment value is an average value of settlement risk positions position across the multiple switch sites for a period prior to the period of time; and
   control circuitry configured to:
     compare the debit cap specific to the switch site to a sum of a) the settlement risk position specific to the switch site, b) the adjustment value, and c) the transaction amount of the new transaction request; and in response to the sum exceeding the debit cap specific to the switch site, reject the new transaction request.

2. The system according to claim 1, wherein the adjustment value is determined periodically.

3. The system according to claim 1, wherein a same absolute adjustment value is provided to each of the multiple switch sites.

4. The system according to claim 3, wherein a sign of the adjustment value, for each of the multiple switch sites, is determined based on the settlement risk position specific to the switch site.

5. A system for receiving transaction requests from an entity and facilitating settlement of funds associated with the transaction requests, the system comprising multiple switch sites each including multiple switches operable to receive the transaction requests from the entity and to communicate with one another via a network to process messages associated with the transaction requests from the entity, wherein each of the multiple switch sites further includes:

circuitry configured to access:

a settlement risk position specific to the switch site, the settlement risk position including a sum of transaction amounts for ones of the transaction requests from the entity previously processed by the switches of the switch site over a period of time;

a debit cap value specific to the switch site, wherein the debit cap value is based on a total debit cap value associated with the entity and a number of the multiple switch sites; and a new transaction request having a transaction amount;

circuitry configured to receive an adjustment value over the network and to generate the settlement risk position specific to the switch site based on the adjustment value, wherein the adjustment value is based on a value of settlement risk positions across the multiple switch sites for a period prior to the period of time; and circuitry configured to:

compare the debit cap value specific to the switch site to a sum of a) the settlement risk position specific to the switch site, b) the adjustment value, and c) the transaction amount value of the new transaction request; and in response to the sum exceeding the debit cap value specific to the switch site, reject the new transaction request.

* * * * *